(12) United States Patent
Predescu et al.

(10) Patent No.: US 9,469,555 B2
(45) Date of Patent: Oct. 18, 2016

(54) MAGNETIC NANOSTRUCTURES AND DEVICE IMPLEMENTING SAME

(71) Applicants: Cristian Predescu, Bucharest (RO); Ecaterina Matei, Bucharest (RO); Andra Mihaela Predescu, Bucharest (RO); Andrei Constantin Berbecaru, Bailesti (RO); Ruxandra Vidu, Citrus Heights, CA (US)

(72) Inventors: Cristian Predescu, Bucharest (RO); Ecaterina Matei, Bucharest (RO); Andra Mihaela Predescu, Bucharest (RO); Andrei Constantin Berbecaru, Bailesti (RO); Ruxandra Vidu, Citrus Heights, CA (US)

(*) Notice: Subject to any disclaimer, the term of this patent is extended or adjusted under 35 U.S.C. 154(b) by 271 days.

(21) Appl. No.: 14/308,711

(22) Filed: Jun. 19, 2014

(65) Prior Publication Data
US 2015/0368126 A1 Dec. 24, 2015

(51) Int. Cl.
| | | |
|---|---|---|
| C02F 1/28 | (2006.01) | |
| B03C 1/015 | (2006.01) | |
| C02F 1/48 | (2006.01) | |
| B03C 1/01 | (2006.01) | |
| B03C 1/033 | (2006.01) | |
| B03C 1/28 | (2006.01) | |
| C02F 101/20 | (2006.01) | |
| C02F 101/22 | (2006.01) | |

(52) U.S. Cl.
CPC ............... C02F 1/488 (2013.01); B03C 1/01 (2013.01); B03C 1/0335 (2013.01); B03C 1/288 (2013.01); B03C 2201/18 (2013.01); C02F 1/281 (2013.01); C02F 2101/20 (2013.01); C02F 2101/22 (2013.01); C02F 2201/009 (2013.01); C02F 2201/48 (2013.01); C02F 2303/16 (2013.01); C02F 2305/08 (2013.01); Y02W 10/33 (2015.05); Y02W 10/37 (2015.05)

(58) Field of Classification Search
None
See application file for complete search history.

(56) References Cited

U.S. PATENT DOCUMENTS

| | | | | |
|---|---|---|---|---|
| 5,667,677 | A * | 9/1997 | Stefanini | B01J 19/12 210/222 |
| 5,944,986 | A * | 8/1999 | Saho | B03C 1/01 209/213 |
| 7,520,994 | B2 * | 4/2009 | Dong | B01D 15/00 210/661 |
| 8,636,906 | B2 * | 1/2014 | Stein | B03C 1/01 210/683 |
| 2009/0024019 | A1 * | 1/2009 | Stein | G01N 33/54326 600/409 |
| 2010/0051557 | A1 * | 3/2010 | Etemad | C02F 1/281 210/688 |
| 2010/0102003 | A1 * | 4/2010 | Holland | C02F 1/487 210/695 |
| 2012/0018382 | A1 * | 1/2012 | Stein | B03C 1/01 210/663 |
| 2012/0141602 | A1 * | 6/2012 | Escolano | C08F 2/44 424/647 |
| 2013/0149539 | A1 * | 6/2013 | Krishnan | A61K 41/0052 428/407 |
| 2013/0220933 | A1 * | 8/2013 | Farone | C02F 1/28 210/663 |
| 2014/0224741 | A1 * | 8/2014 | Farone | C02F 1/444 210/668 |
| 2015/0217222 | A1 * | 8/2015 | Hedin | B01J 20/28064 428/219 |

* cited by examiner

Primary Examiner — Krishnan S Menon

(57) ABSTRACT

A method and apparatus for selective removal of heavy ions, biological, cations, anions or other elements of interest from liquids using magnetic nanoparticles, and recovery of nanoparticles to be reused in the wastewater purification. For certain embodiments, after water treatment and magnetic separation, the loaded nanoparticles may be washed, regenerated, collected and re-introduced in the water treatment cycle. Water treatment and particle regeneration take place singly or simultaneously. In another disclosed embodiment of the process, the electricity consumed by the pumping system is supplied by renewable energy sources such as solar, wind, geothermal, biogas or small hydro.

9 Claims, 37 Drawing Sheets

FIG. 10A
FIG. 10B
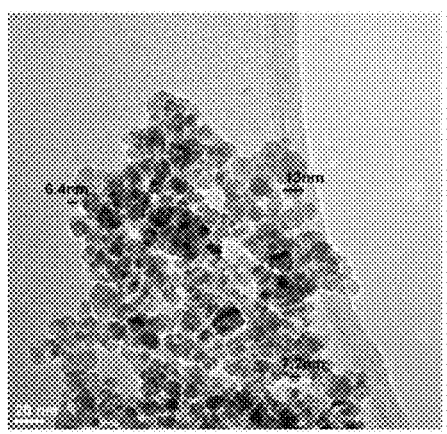
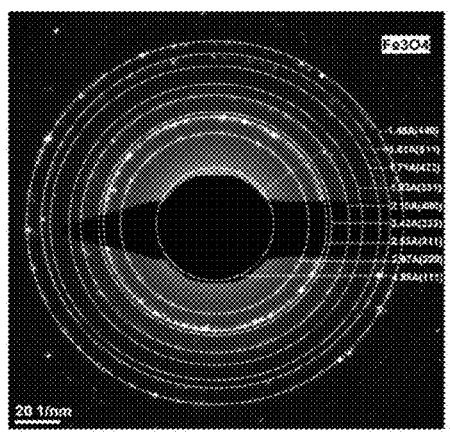
FIG. 10

FIG. 11A
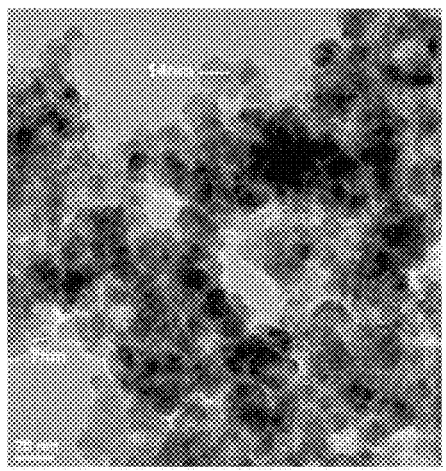
FIG. 11B
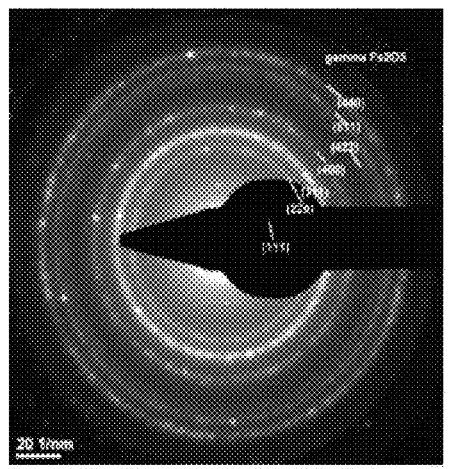
FIG. 11

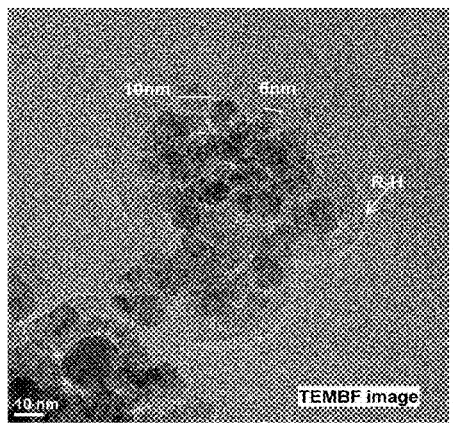
FIG. 16A
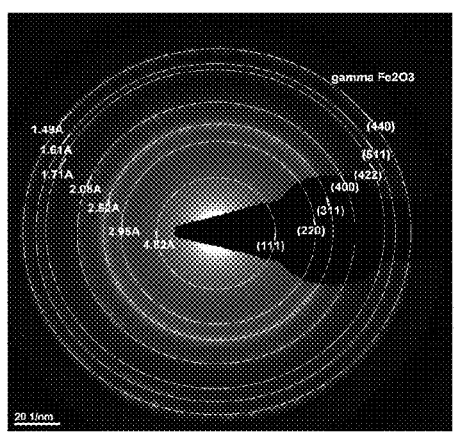
FIG. 16B
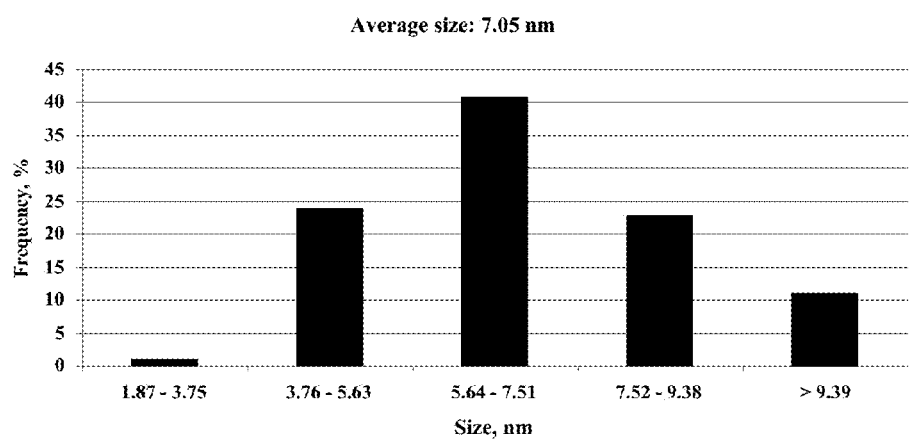
FIG. 16C
FIG. 16

FIG. 18A
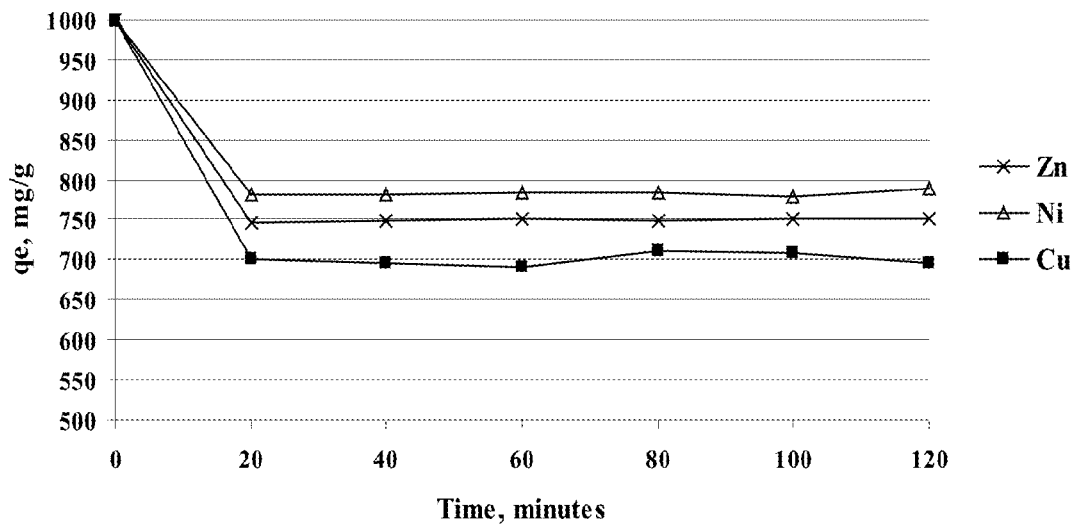
FIG. 18B
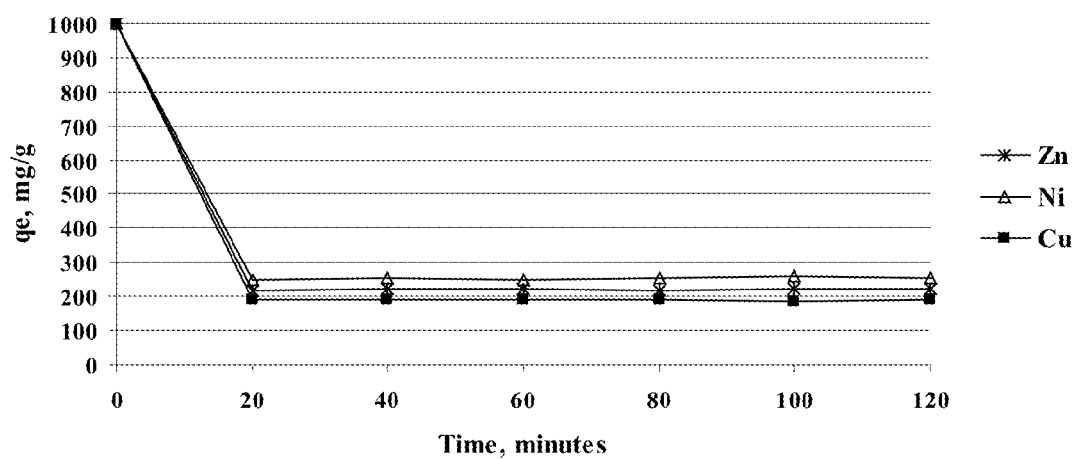
FIG. 18

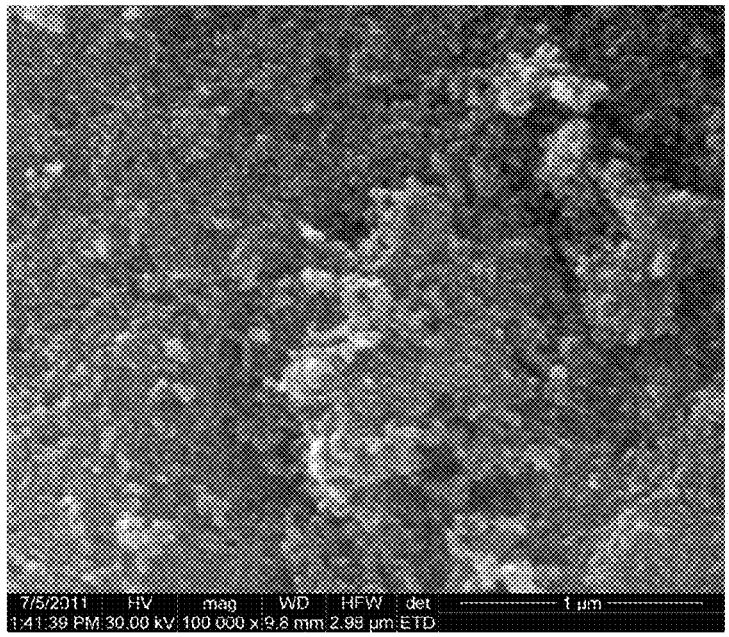
FIG. 21A
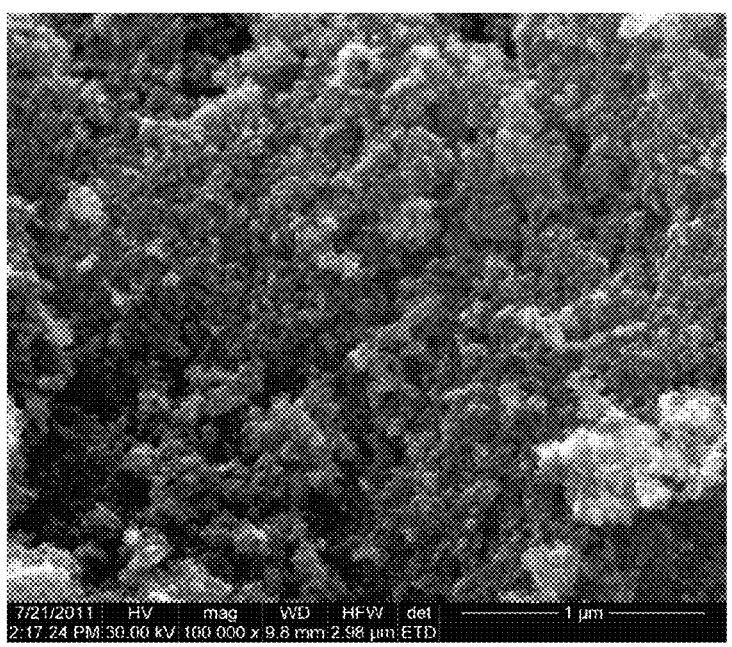
FIG. 21B
FIG. 21

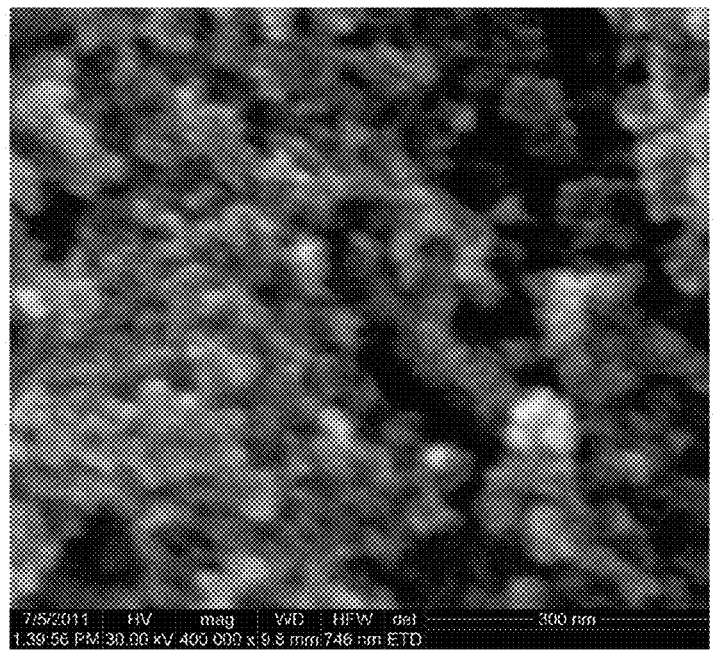
FIG. 22A
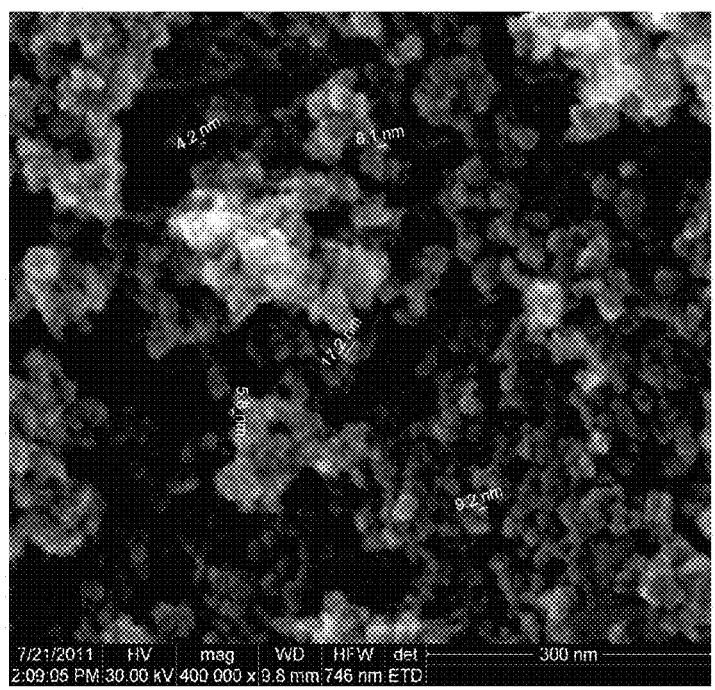
FIG. 22B
FIG. 22

FIG. 24A
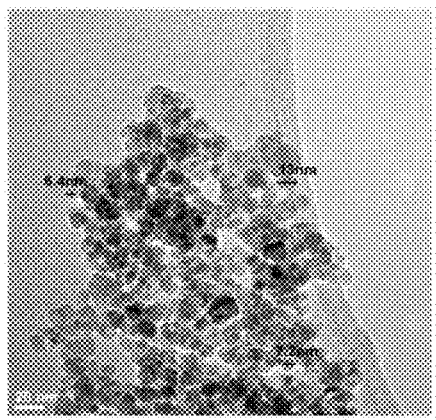
FIG. 24B
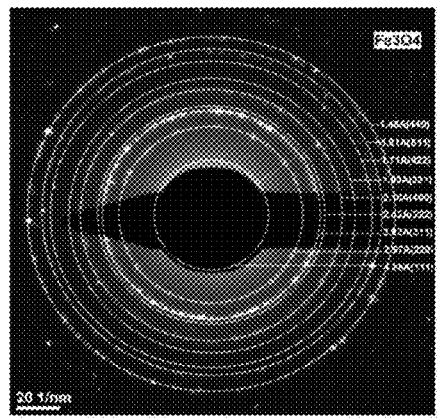
FIG. 24C
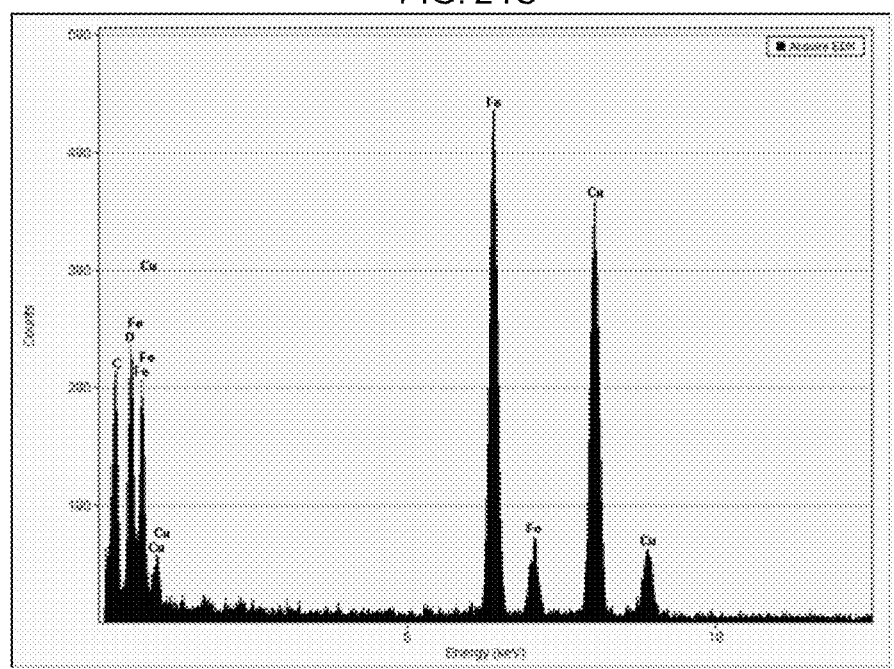
FIG. 24

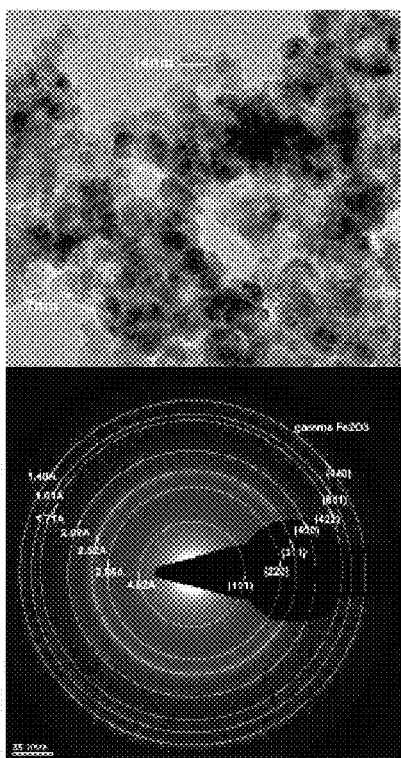
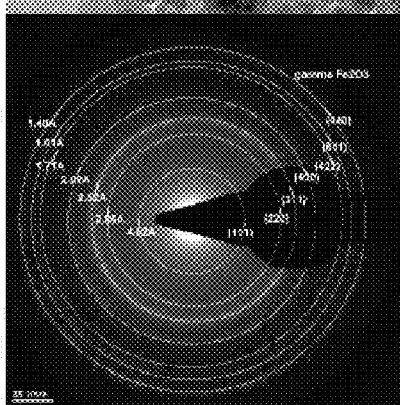
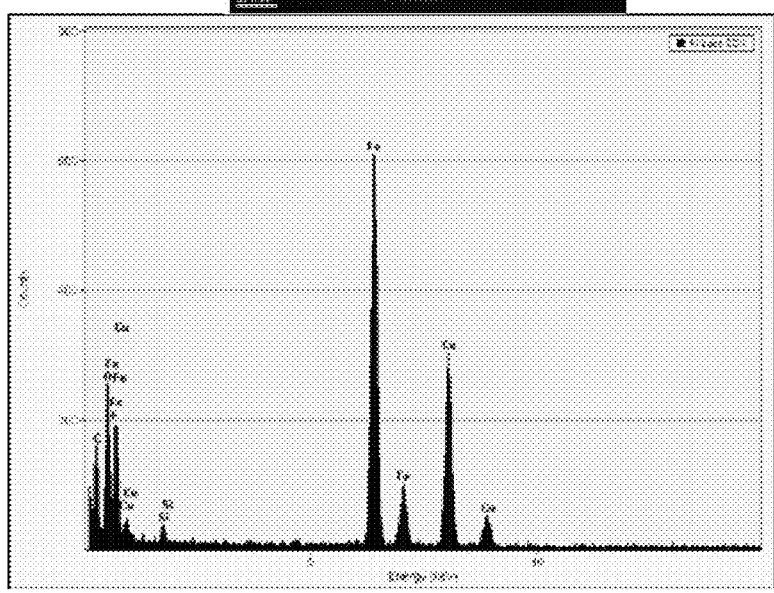
FIG. 26A
FIG. 26B
FIG. 26C
FIG. 26

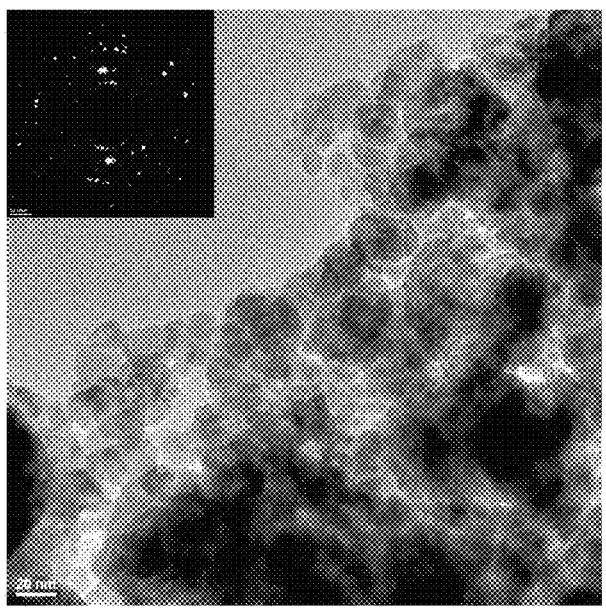
FIG. 28A
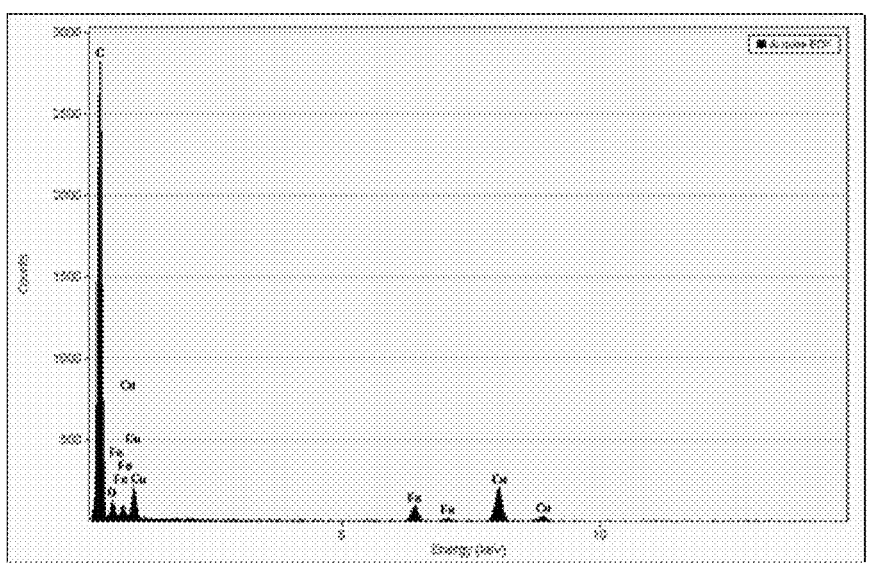
FIG. 28B
FIG. 28

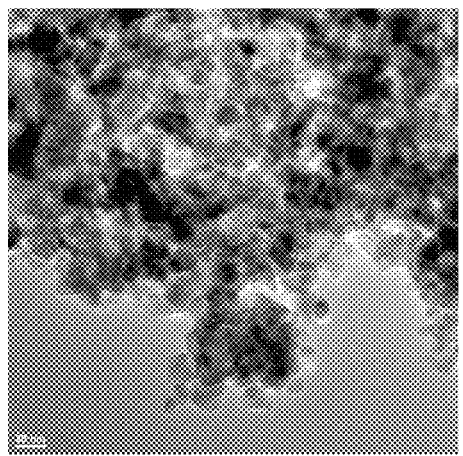
FIG. 30A
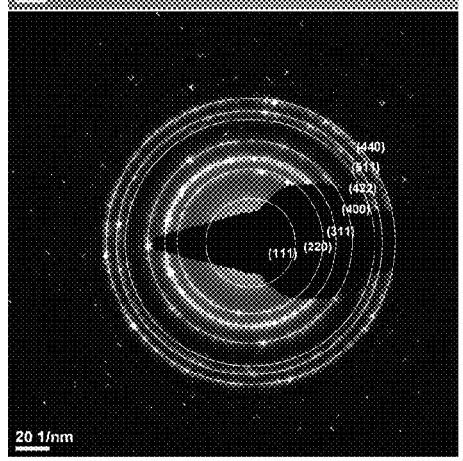
FIG. 30B
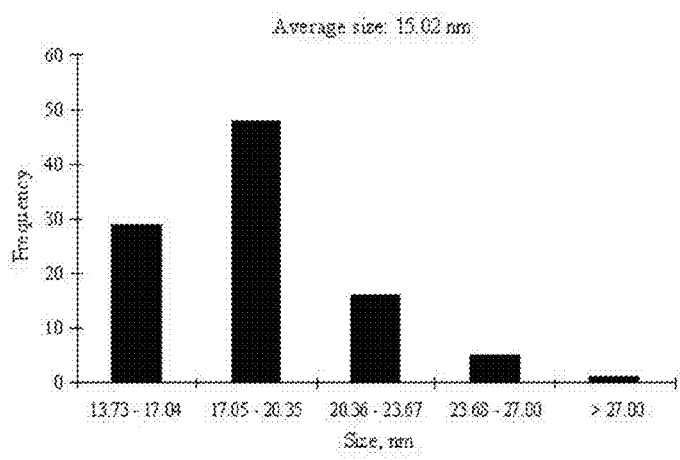
FIG. 30C
FIG. 30

FIG. 32

| Time, (minutes) | Removal efficiency (η, %) of heavy metals from quaternary solutions with different concentrations: | | | | | | | | | | | |
|---|---|---|---|---|---|---|---|---|---|---|---|---|
| | 10 mg/L | | | | 20 mg/L | | | | 50 mg/L | | | |
| | Cr | Cd | Ni | Cu | Cr | Cd | Ni | Cu | Cr | Cd | Ni | Cu |
| 10 | 88.10 | 92.80 | 91.10 | 89.56 | 95.55 | 94.64 | 90.20 | 89.73 | 97.00 | 93.45 | 94.58 | 90.79 |
| 20 | 88.00 | 90.83 | 91.20 | 89.18 | 95.45 | 91.08 | 92.45 | 89.81 | 96.04 | 93.42 | 95.32 | 90.77 |
| 30 | 88.20 | 90.86 | 90.80 | 88.40 | 95.30 | 91.39 | 90.85 | 90.44 | 97.00 | 93.67 | 94.30 | 91.39 |
| 40 | 87.90 | 90.64 | 90.70 | 89.36 | 95.50 | 91.09 | 94.90 | 90.31 | 96.80 | 92.21 | 94.50 | 91.19 |
| 50 | 88.13 | 90.45 | 93.30 | 88.21 | 95.68 | 91.24 | 91.30 | 89.44 | 97.00 | 92.64 | 96.40 | 91.68 |
| 60 | 89.10 | 93.30 | 93.80 | 88.20 | 95.80 | 91.30 | 92.30 | 89.45 | 97.00 | 92.17 | 95.70 | 91.55 |
| 70 | 89.03 | 93.80 | 91.10 | 88.15 | 96.16 | 91.14 | 90.40 | 90.56 | 97.00 | 93.75 | 96.92 | 91.41 |
| 80 | 89.76 | 91.10 | 91.10 | 87.69 | 95.68 | 91.07 | 90.25 | 89.81 | 96.66 | 91.48 | 96.44 | 91.32 |
| 90 | 87.43 | 91.10 | 91.00 | 88.00 | 95.95 | 91.01 | 90.25 | 90.00 | 96.26 | 90.26 | 96.88 | 91.33 |
| 100 | 89.00 | 91.10 | 90.90 | 89.76 | 95.50 | 90.08 | 90.15 | 90.56 | 96.10 | 89.81 | 96.64 | 91.03 |

FIG. 34

| Time, (minutes) | Removal efficiency (η, %) of heavy metals from quaternary solutions with different concentrations: | | | | | | | | | | | |
|---|---|---|---|---|---|---|---|---|---|---|---|---|
| | 10 mg/L | | | | 20 mg/L | | | | 50 mg/L | | | |
| | Cr | Cd | Ni | Cu | Cr | Cd | Ni | Cu | Cr | Cd | Ni | Cu |
| 10 | 95.40 | 97.70 | 95.10 | 97.46 | 96.05 | 96.00 | 95.53 | 95.17 | 98.16 | 97.05 | 98.19 | 98.03 |
| 20 | 97.50 | 97.85 | 97.51 | 97.49 | 96.00 | 98.23 | 99.41 | 95.12 | 98.18 | 97.98 | 98.77 | 98.02 |
| 30 | 98.30 | 97.83 | 93.08 | 97.43 | 97.45 | 98.83 | 99.57 | 95.28 | 98.22 | 98.43 | 99.17 | 98.16 |
| 40 | 100.00 | 98.77 | 99.07 | 97.22 | 100.00 | 99.11 | 99.89 | 95.17 | 99.06 | 98.88 | 99.40 | 98.15 |
| 50 | 100.00 | 98.30 | 97.11 | 97.02 | 100.00 | 99.39 | 100.00 | 95.10 | 100.00 | 99.19 | 99.66 | 96.25 |
| 60 | 100.00 | 98.82 | 100.00 | 97.01 | 100.00 | 99.60 | 100.00 | 95.11 | 100.00 | 99.39 | 99.78 | 96.66 |
| 70 | 100.00 | 99.07 | 100.00 | 97.03 | 100.00 | 99.55 | 100.00 | 95.22 | 100.00 | 99.47 | 99.86 | 96.88 |
| 80 | 100.00 | 99.85 | 100.00 | 97.12 | 100.00 | 99.81 | 100.00 | 95.08 | 100.00 | 99.60 | 100.00 | 96.33 |
| 90 | 100.00 | 99.64 | 100.00 | 97.21 | 100.00 | 99.78 | 100.00 | 95.28 | 100.00 | 99.59 | 100.00 | 96.33 |
| 100 | 100.00 | 99.50 | 100.00 | 97.10 | 100.00 | 99.69 | 100.00 | 95.11 | 100.00 | 99.50 | 99.98 | 96.35 |

FIG. 35

| Metals from solution | Removal efficiency (%) due to precipitation process for quaternary solution with different initial concentrations: | | |
|---|---|---|---|
| | 10 mg/L | 20 mg/L | 50 mg/L |
| Cr | 84.36 | 82.37 | 83.25 |
| Cd | 86.23 | 85.47 | 85.74 |
| Ni | 85.11 | 84.95 | 83.95 |
| Cu | 88.32 | 87.21 | 88.11 |

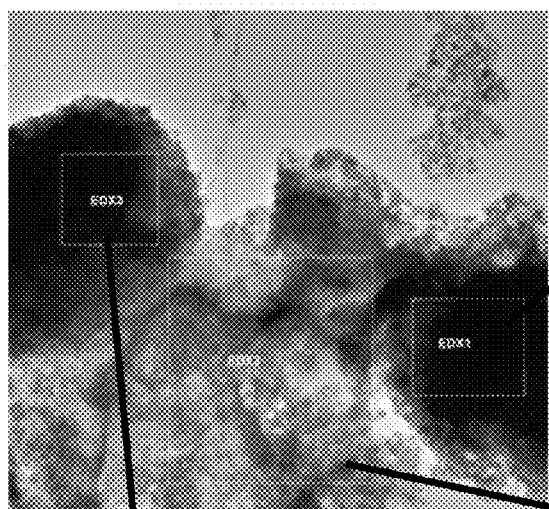
FIG. 36A
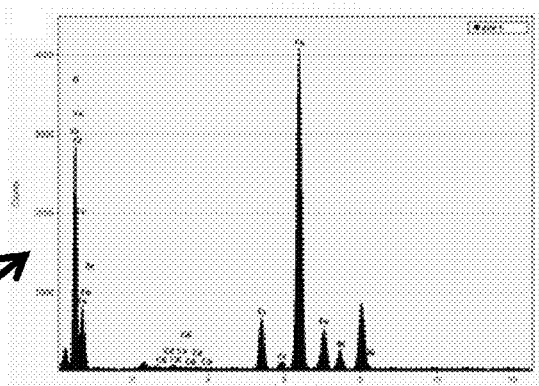
FIG. 36B
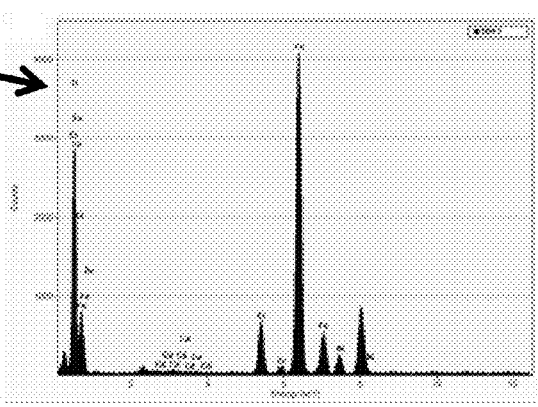
FIG. 36C
FIG. 36D
FIG. 36

FIG. 37

| Metal | Initial concentration of metal, mg/L | Langmuir parameters | | | | |
|---|---|---|---|---|---|---|
| | | pH 2.5 | | pH 8.5, after precipitation with NaOH | | |
| | | $q_e$ (mg/g)* | $R^2$ | Ions in solution after precipitation mg/L | $q_e$ (mg/g)* | $R^2$ |
| Cr | 10 | 8.81 | 0.9989 | 0.842 | 0.73 | 0.9991 |
| | 20 | 19.11 | | 0.820 | 0.67 | |
| | 50 | 48.50 | | 0.862 | 0.59 | |
| Cd | 10 | 9.28 | 0.9999 | 1.38 | 1.15 | 0.9979 |
| | 20 | 18.93 | | 1.49 | 1.19 | |
| | 50 | 46.72 | | 1.68 | 1.40 | |
| Ni | 10 | 9.11 | 0.9989 | 1.48 | 1.24 | 0.9993 |
| | 20 | 18.04 | | 1.46 | 0.82 | |
| | 50 | 47.29 | | 1.56 | 0.86 | |
| Cu | 10 | 8.96 | 0.9988 | 1.17 | 0.216 | 0.9802 |
| | 20 | 17.94 | | 1.27 | 0.303 | |
| | 50 | 45.39 | | 1.19 | 0.205 | |

* time: 10 minutes

MAGNETIC NANOSTRUCTURES AND DEVICE IMPLEMENTING SAME

FIELD OF THE INVENTION

The present invention relates to magnetic nanoparticles, methods of using magnetic nanoparticles for water treatment and apparatus. More particularly, the present invention is directed to a magnetic separation apparatus which uses magnetic nanoparticles to remove undesirable ions from liquids be treated in which pollutants and toxic elements such as Sb, Hg, Zn, Cu Cd, Cr, and the like are contained, to thereby purify the liquid at a high rate. The magnetic separation apparatus contains a second container where nanoparticles can be cleaned up and re-used. The liquid purification apparatus can work in tandem, the two containers working reversibly.

DESCRIPTION OF THE RELATED ART

The removal of heavy metals from waters represents an environmental challenge for many years. International regulations such as the United States Environmental Protection Agency, EPA 822-R-04-005, (2004), and the Official Journal of the European Communities. Council Directive on pollution caused by certain dangerous substances discharged into the aquatic environment of the Community 76/464/EEC, (1976), established metal effluents limits to parts per million (ppm) or even lower.

In this context, alkaline precipitation with metal hydroxide formation for ppm levels and ionic exchange method for trace metals represent efficiently technologies for wastewaters treatment. However, many wastewaters still contain pollutants at a level higher than the regulations. Many of wastewaters such as basic oxygen furnace (BOF) wastewaters obtained from gas wet scrubbing process and the like may contain ions of heavy metals in a concentration that exceed the legal limits set forth by the legislation for discharge treated industrial waters into natural water bodies.

Conventionally, wastewater treatments include sedimentation for suspended solids removal, physical and chemical treatment, including pH adjustment in order to precipitate metals as hydroxides, and coagulation-flocculation with ferrous sulphate. Additionally, the wastewater treatments include filtration as an advanced treatment step. Elevated concentrations of heavy metal ions have been and continue to be a major problem all over the world.

Currently, disinfection is accomplished by filtration and then chemical treatment, when disinfectant chemicals are added to kill pathogens that escaped filters. Besides common pathogens such as viruses and bacteria, there are other inorganic materials found in some groundwater sources.

There are naturally acidic waters containing lead ions. Because one source of lead in groundwater is lead pipes, insoluble lead salts are created on the inner surface of the pipes both by using small quantities of phosphate ions and slightly increasing the pH of the waters. There are ground waters containing radium, which is commonly removed by ion exchange.

The removal of some toxic metals such as chromium, cadmium, copper, lead, nickel, and mercury from wastewaters has received considerable attention in recent years due to their toxicity and carcinogenicity. Most of these metals are non-biodegradable and can be accumulated in living tissues causing various diseases and disorders, increasing the risk to the environment and human health (Balan et al. (2009), Environmental Engineering and Management Journal, 9, 225-231). Different methods were investigated and applied to remove these metals such as adsorption, chemical precipitation, ion exchange, filtration, membrane separation and reverse osmosis.

Adsorption is widely used because it is a simple method and adsorbent materials are available in a wide range.

The industrial wastewater effluents contain mainly the various heavy metals, which are a real threat to the environment and public health, because their toxicity and persistence in the environment. Chromium and its compounds are presented in wastewaters from iron and steel, metal finishing, leather industries or nuclear power plants. Quantities of hexavalent chromium from these wastewaters are ranged between 10 and 100 mg/L (Balan C. et al. (2010), *Environmental Engineering and Management Journal*, 9, 469-478). There are a few methods to remove hexavalent chromium such as chemical reduction followed by precipitation. However, a high quantity of sludge is generated and high quantities of reagents are necessary. Additional advanced methods for water decontamination include pH adjustment, coprecipitation of the metal hydroxides, adsorption on activated carbon or alumina, ionic exchange or reverse osmosis. Adsorption of arsenic and chromium on different sorbents such as iron oxides or iron coated activated carbon (Petrusevski B. et al. (2002), *Journal of Water Supply: Research and Technology—Aqua*, 51, 135-144.), and granular ferric hydroxides (Driehaus W. et al., (1998), Journal of Water Supply: Research and Technology—Aqua, 47, 1-6.) have also been investigated. However, the use of these sorbents is limited due to high operation cost, sludge formation, and technical difficulties in preparation of the adsorbents.

Nanotechnology has brought to us a new class of adsorbents, i.e. magnetic nanoparticles. Nanoparticles that possess magnetic properties have the capability to be use in water treatments because they can adsorb the pollutants and then they can be collected by applying a magnetic field, and then recovered, washed and recycled. Magnetic nanoparticles can be conjugated to make them selective for specific ions or molecules as disclosed in US Patent Application Pub. No. 2009/024019 A1, U.S. Ser. No. 12/175,147, and US Patent No. 2014/8,636,906 incorporated herein by reference and made a part hereof. When added to an aqueous solution, the ions bind to ion receptors and by means of an external magnetic field the bound-nanoparticle complexes are pulled out of solution.

Presently, due to the developments in nanotechnology, nanomaterials became the materials of choice for reducing the wastewaters and soils, accelerating the coagulation of sewage, removing radionuclides, adsorbing organic dyes and cleaning up the contaminated soils. The importance of nanomaterials in wastewater treatment is due to the high surface area and high active surface sites of nanomaterials. In these conditions, a high adsorption capacity and a selective removal of specific pollutants become the critical characteristics for nanomaterials used in wastewater treatment. U.S. Pat. No. 5,944,986 proposes a magnetic separation apparatus which uses coagulation and flocculation processes to treat waters. Magnetic separation is accompanied by a magnetic filter and centrifugal separation to efficiently remove target substances.

Among the nanomaterials used in water treatment, magnetic nanoparticles are efficient adsorbents. Moreover, magnetic nanoparticles have the advantage of magnetic separation, which efficiently couple with ionic exchange capacity for the removal of heavy metals pollutants.

Nano-iron oxides, such as magnetite ($Fe_2O_3$) and maghemite ($\gamma$-$Fe_2O_3$), and also different ferrite compounds are known as materials used in different biological and industrial application. These materials have unique magnetic and electronic properties. A liquid purification method using magnetic nanoparticles is proposed in U.S. Pat. No. 8,636,906, where magnetic nanoparticles may selectively remove target ions and molecules from liquids, but there is no way of re-using nanoparticles proposed.

The adsorption capacity of magnetic iron oxide nanoparticles was proved by their efficiency of removing various pollutants from aqueous solutions. High efficiency rate was obtained in case of metals removal from solutions, such as Cu with magnetite, As and Cr binary system with mixed magnetite-maghemite nanoparticles. Studies regarding the hexavalent chromium from aqueous solutions were performed using adsorption tests on iron nanoparticles. The removal efficiency was high in acidic media. Recently, the organic compounds such as pentachlorophenol or an acidic dye (New Coccine) were able to be adsorbed with good results from aqueous solutions onto magnetite nanoparticles. The synthesis of nano-iron oxides is simple and highly reproducible. Among all nano-iron oxides, magnetic nanocrystals present very interesting applications.

Ferrofluid, a stable suspension of surfactant coated magnetic nanoparticles in a non-magnetic liquid carrier, has been one of the most widely studied nanofluids due to their multiple applications. Magnetite is a magnetic product frequently used one because of its high saturation magnetization value. Magnetic maghemite ($\gamma$-$Fe_2O_3$) nanoparticles are also efficient adsorbent. Wang et al. in Biores. Technol. 100 (2009) studied the ionic exchange capacity of maghemite for the removal of heavy metals pollutants coupled with magnetic separation.

Magnetic nanocomposites in which magnetic nanoparticles are dispersed in a nonmagnetic matrix have been found to possess entirely different magnetic characteristics with respect to their bulk counterparts. The effect of particle size dominates the magnetic properties of magnetic nanoparticles and the effect becomes more prominent when the particle size decreases. In this case, the separation of nanoparticles under external magnetic field becomes a very attractive and efficient method. A polymer matrix such as cationic resin that embeds $\gamma$-$Fe_2O_3$ nanoparticles acts as a template agent, impedes nanoparticles aggregation and can stabilize the nanoparticles.

Due their chemical stability, biocompatibility and heating ability, ferrofluids of maghemite nanoparticles can be used for ferrofluids hyperthermia in tumor treatment [Sun Y-K, in Colloids and Surfaces A Physicochem. Eng. Aspects 245, 15 (2004)]. US20130149539 proposed tuned multifunctional magnetic nanoparticles for biomedicine and presents compositions and methods of making magnetic nanoparticles having a narrow size distribution for use in diagnostics and therapeutics.

The physical properties of the magnetic nanomaterials are depended on the particle size, being known that materials with nanometer-size particles (3-10 nm in diameter) exhibit novel electronic, optical, magnetic, chemical and bio-medical properties. The size of the $Fe_2O_3$ nanoparticles is strongly dependent on the pH and the ionic strength of the precipitation medium. At a fixed ionic strength, the particle size decreases with the increasing of the pH. At a fixed pH value, the size decreases with increasing of the ionic strength. Above a critical pH, dependent on the ionic strength, no secondary growth takes place under aging in the pH and ionic strength conditions [J. P. Jolivet et al. in J. Phys. IV France 7, C1 573 (1997)]. A system containing magnetic nanoparticles and polymers, such as nanocomposites and ferrofluids, and applications is presented in US20120141602, where the system contains a material system comprising magnetic nanoparticles of a metal oxide and a polymer that contains monomers with different functional groups. The proposed material system that can be solid (nanocomposite) or liquid (ferrofluid) has its use mainly in biotechnological, veterinary and medical applications, such as for the diagnosis and treatment of human diseases.

Apparatus for the use of nanoparticles in removing chemicals from aqueous solutions with subsequent water purification is proposed in US20130220933. The proposed apparatus for removing target chemicals from water includes a reaction chamber, a source of an aqueous solution of the target chemicals that can be supplied on demand to the reaction chamber. Particles and the target chemicals are allowed to react and the target be removed from water. Particles are entrained inside the reactor using a microfilter configured to be back flushed while more aqueous solution is added to the reactor to be cleaned.

Good adsorption results onto magnetite nanoparticles or modified magnetite nanoparticles were obtained in mono-component solutions of $Cr^{6+}$ or $Cu^{2+}$. Also, the removal of $Hg^{2+}$ from waste waters has been assessed using silica coated magnetite nanoparticles. Different types of magnetic nanoparticles (i.e.: $\gamma$-$Fe_2O_3$, ferrites such as $MnFe_2O_4$, $CuFe_2O_4$, $NiFe_2O_4$) were used for the removal of hexavalent chromium from contaminated solutions.

Favorable activities of magnetite nano-particles have been reported for the adsorption/reduction of several toxic metal ions (e.g. $Ni^{2+}$, $CU^{2+}$, $Cd^{2+}$, $Zn^{2+}$ and $Cr^{6+}$) and the catalytic degradation of some organic contaminants. Metal ions ($Cu^{2+}$, $Ni^{2+}$, $Cr^{6+}$) from multicomponent solution were adsorbed with good results onto magnetite nanoparticles under acidic or basic conditions.

The synthesized $Fe_2O_3$ nanoparticles with different mean particle sizes (8, 12 and 35 nm) were used for wastewater contaminated with metal ions such as Ni(II), Cu(II), Cd(II) and Cr(VI), the results showing the increasing of adsorption capacity with decreasing the particle size and increasing the surface area. Also, decreasing sizes and structural distortions increase the adsorption capacity, which became approximately 7 times higher than the coarse particles, this being attributed to the highly-distorted surface.

BRIEF SUMMARY OF THE INVENTION

The present invention relates to magnetic nanoparticles, methods and apparatus of using magnetic nanoparticles for selective removal of heavy ions, biological, cations, anions or other elements of interest from liquids, and recovery of nanoparticles to be reused in the wastewater purification.

Magnetic nanoparticles are obtained preferably by synthesis. Magnetic nanoparticles are also synthetic analogues of any suitable magnetic material or combination of materials, such as magnetite, hematite, maghemite, iron, nickel, cobalt, and alike or any combination thereof. The magnetic nanoparticles can be of various sizes and shapes. Nanoparticle shapes include spherical, tubes, wires, cable structures, shapes with variable composition on the length of the nanostructures and any combination thereof.

In one embodiment, magnetic $Fe_2O_3$ nanoparticles were prepared by coprecipitation of ferrous ion ($Fe^{2+}$) and ferric ion ($Fe^{3+}$) with NaOH solution. The precipitates were separated by magnetic decantation or slow filtration after which it was washed several times with distilled water and ethanol. The magnetite nanoparticles were dried in oven.

The magnetic nanoparticles may be used alone, or coated or complexed with one or more materials that enhance the selectivity or the affinity of the magnetic nanoparticles to the desired target element of interest. The magnetic nanoparticles may be coated with one or more materials that enhance the stability of the magnetic nanoparticles in a liquid environment.

In one disclosed embodiment of the process, the magnetic particles are added to and mixed with the liquid containing the target impurities. Magnetic nanoparticles are held in contact with a liquid for a sufficient period of time to form a complex or conjugate with the target. After the magnetic nanoparticles adsorbed the target, the liquid containing nanoparticles is subjected to an external magnetic field that causes the loaded nanoparticles to segregate. The magnetic separation of nanoparticles leaves a portion of liquid purified and free of target-loaded nanoparticles.

In one disclosed embodiment of the process, the magnetic nanoparticles are then washed and regenerated in the same or a separate chamber using process conditions that release the target from nanoparticles. Further, the target can be collected for use in other processes.

In one disclosed embodiment of the process, the regenerated magnetic nanoparticles are re-introduced in the system and re-used in the water treatment process. The purification cycle is restarted. The water purification chamber and the nanoparticle washing chamber work in tandem.

In another disclosed embodiment of the process, the water purification and the nanoparticle washing are performed in the same chamber. A battery of chambers are required depending of the volume of polluted water needed to be purified.

In another disclosed embodiment of the process, the electricity is supplied using renewable energy sources such as solar, wind, geothermal, biogas or small hydro.

Pumping system is using the most of the electricity. By using renewable energy sources, the water treatments provide clean safe drinking water in remote locations, where there is a need for water decontamination and purification units such as irrigations, disaster relief or military applications.

BRIEF DESCRIPTION OF THE DRAWINGS

FIGS. 10A and 10B are transmission electronic microscopy through bright field (TEMBF) for $Fe_3O_4$ (FIG. 10A) and the corresponding selected area electron diffraction (SAED) image (FIG. 10B).

FIGS. 11A and 11B are transmission electronic microscopy through bright field (TEMBF) for $\gamma\text{-}Fe_2O_3$ (FIG. 11A) and the corresponding selected area electron diffraction (SAED) image (FIG. 11B).

FIGS. 16A, 16B and 16C shows the transmission electron microscopy images (FIG. 16A) of R—H-$\gamma\text{-}Fe_2O_3$ nanoparticles, the corresponding selected area electron diffraction (SAED) image (FIG. 16B) image, and the average size distribution (FIG. 16C).

FIGS. 18A and 18B shows the variation in time of the amount of metal ions removed on $\gamma\text{-}Fe_2O_3$ (FIG. 18A) and R—H-$\gamma\text{-}Fe_2O_3$ (FIG. 18B).

FIG. 21 are scanning electron images (SEM) of $Fe_3O_4$ (FIG. 21A) and $Fe_3O_4$-D (FIG. 21B) at 100,000×.

FIG. 22 are scanning electron images (SEM) of $Fe_3O_4$ (FIG. 22A) and $Fe_3O_4$-D (FIG. 22B) at 400,000×.

FIGS. 24A, 24B and 24C are transmission electronic microscopy through bright field (TEMBF) for $Fe_3O_4$ (FIG. 24A) and the corresponding selected area electron diffraction (SAED) image (FIG. 24B) and EDAX image (FIG. 24C).

FIG. 26 Transmission electron microscopy (TEMBF) image for $\gamma\text{-}Fe_2O_3$ (FIG. 26A) and the corresponding SAED image (FIG. 26B) and EDX spectrum (FIG. 26C).

FIG. 28 show the transmission electron image of $CuFe_2O_4$ nanoparticles (FIG. 28A) and the corresponding EDAX spectrum (FIG. 28B).

FIGS. 30A, 30B and 30C shows the transmission electron microscopy images (FIG. 30A) of $Fe_2O_3$ nanoparticles, the corresponding selected area electron diffraction (SAED) image (FIG. 30B) image, and the average size distribution (FIG. 30C).

FIG. 32 is a table with the removal efficiency ($\eta$) for Cr, Cd, Ni and Cu at pH 2.5.

FIG. 34 is a table showing the removal efficiency ($\eta$, %) for Cr, Cd, Ni and Cu on 0.1 g $Fe_3O_4$ nanoparticles at pH 8.5, after precipitation process.

FIG. 35 is a table showing the removal efficiency ($\eta$, %) for Cr, Cd, Ni and Cu after 10 minutes of contact with NaOH solution.

FIGS. 36A, 36B, 36C and 36D are the transmission electron microscopy of $Fe_3O_4$ nanoparticles recovered after 10 minutes of contact with quaternary solution of pH 8.5 (FIG. 36A) and the EDX microanalysis on three selected areas (FIGS. 36 B-D).

FIG. 37 is a table showing the Langmuir parameters for adsorbed metals onto $Fe_3O_4$ nanoparticles.

DETAIL DESCRIPTION OF THE EXEMPLARY EMBODIMENTS OF THE INVENTION

The present invention is described more fully hereinafter with references to the accompanying drawings in which embodiments of the invention are shown. This invention may however be embodied in many different forms and should not be constructed as limited to the embodiments set forth herein. Rather these embodiments are provided so that this disclosure will convey the scope of the invention to those skilled in the art.

With references to FIGS. 1-6 exemplary embodiments of the purification system that is configured according to the exemplary design of solenoid columns integrated with wastewater treatment equipment.

FIGS. 1-4 illustrate an example of part of an exemplary embodiment of the magnetic module 100 (front, back top and perspective views, respectively) that consists of two glass columns 102 working in tandem, and having a magnet platform placed in the middle of the column, an external solenoid 104 connected to DC voltage, feeding and collecting systems with inlet and outlet tubes for polluted and decontaminated water, respectively. The electricity can be supplied by a renewable source such as solar panel.

Figure 1:
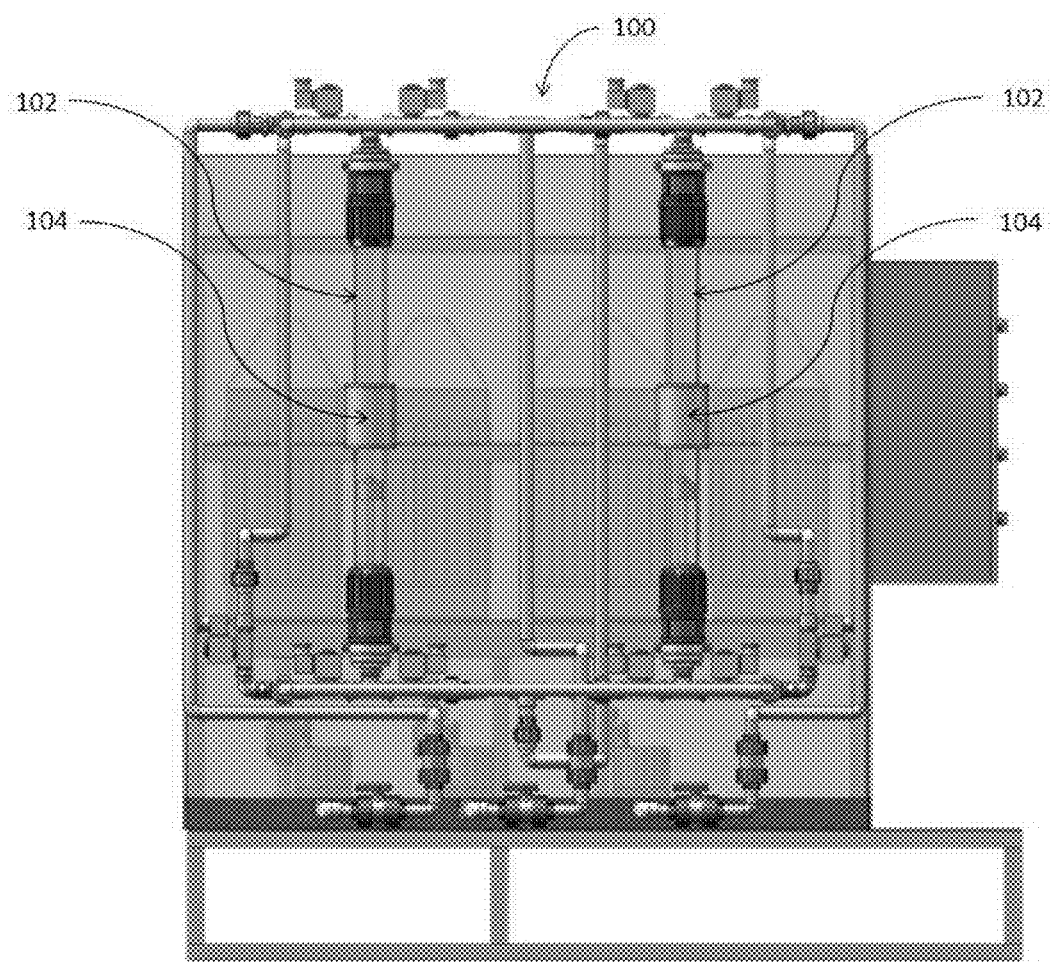
FIG. 1 is a diagram of water treatment apparatus using magnetic nanoparticles (front view) containing: two water columns, sliding solenoid, two-way water pumps that allow for water to flow from tank to tank for multiple cycles.
Figure 2:
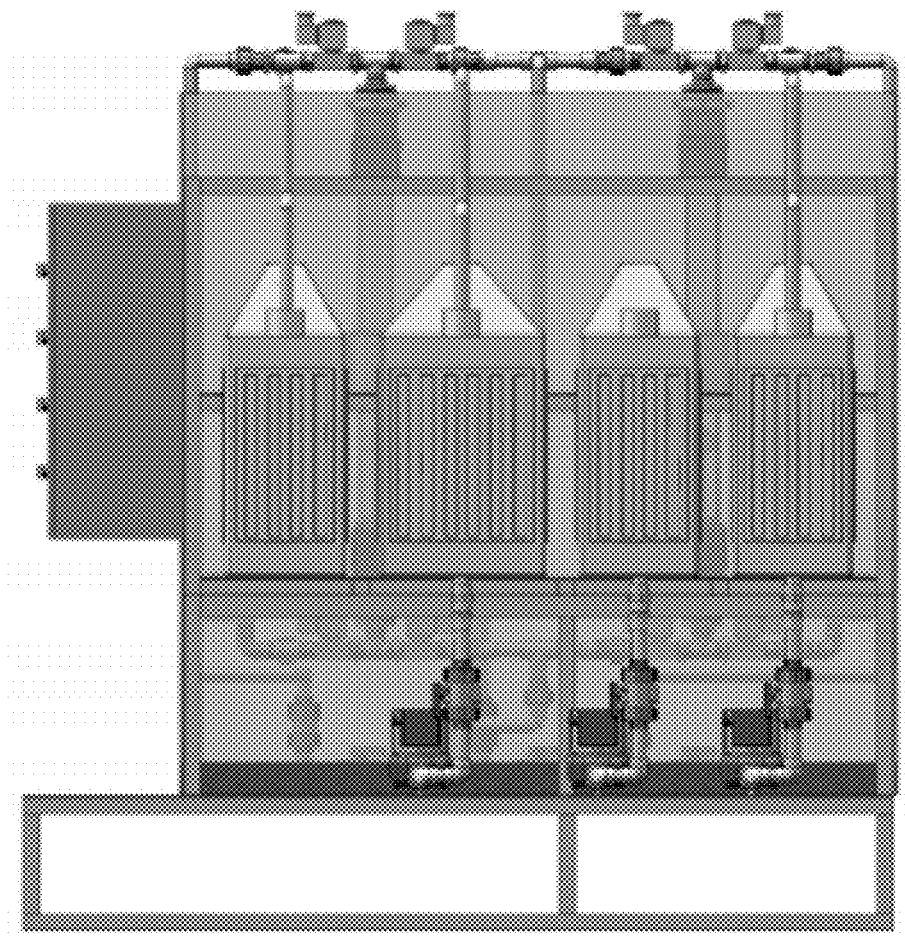
FIG. 2 is a diagram of water treatment apparatus using magnetic nanoparticles (back view) containing four tanks: mixing tank, clean water tank, wash water tank, and waste water tank; two-way water pumps allow for water to flow from tank to tank for multiple cycles.
Figure 3:
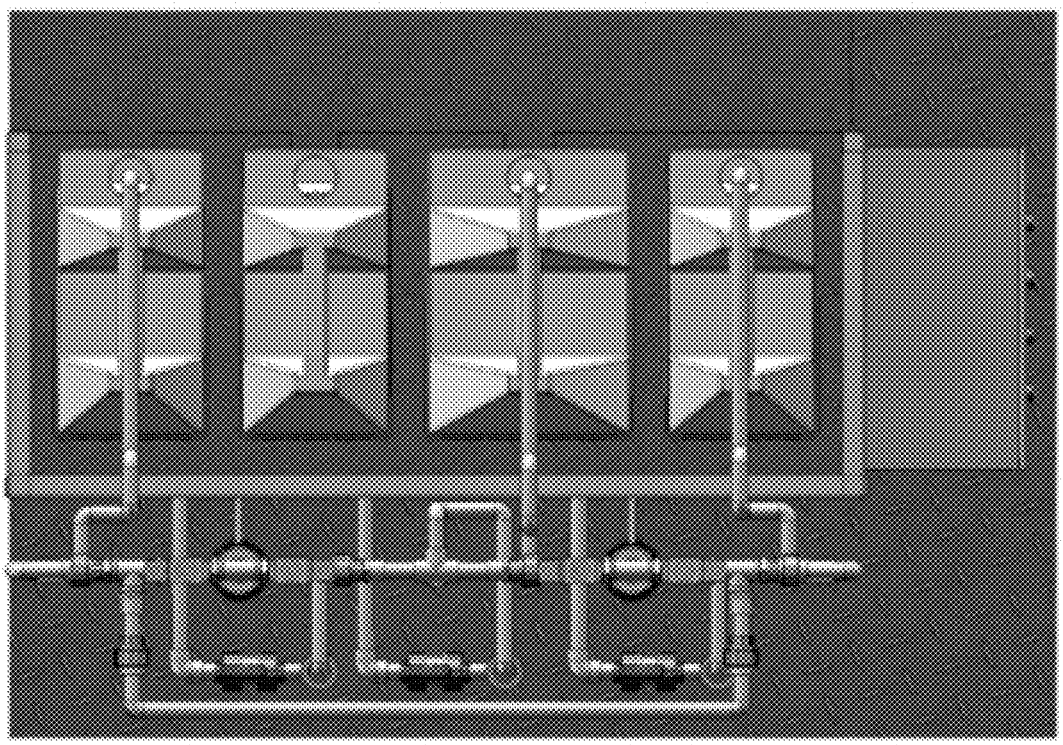
FIG. 3 is a diagram of water treatment apparatus using magnetic nanoparticles (top view).
Figure 4:
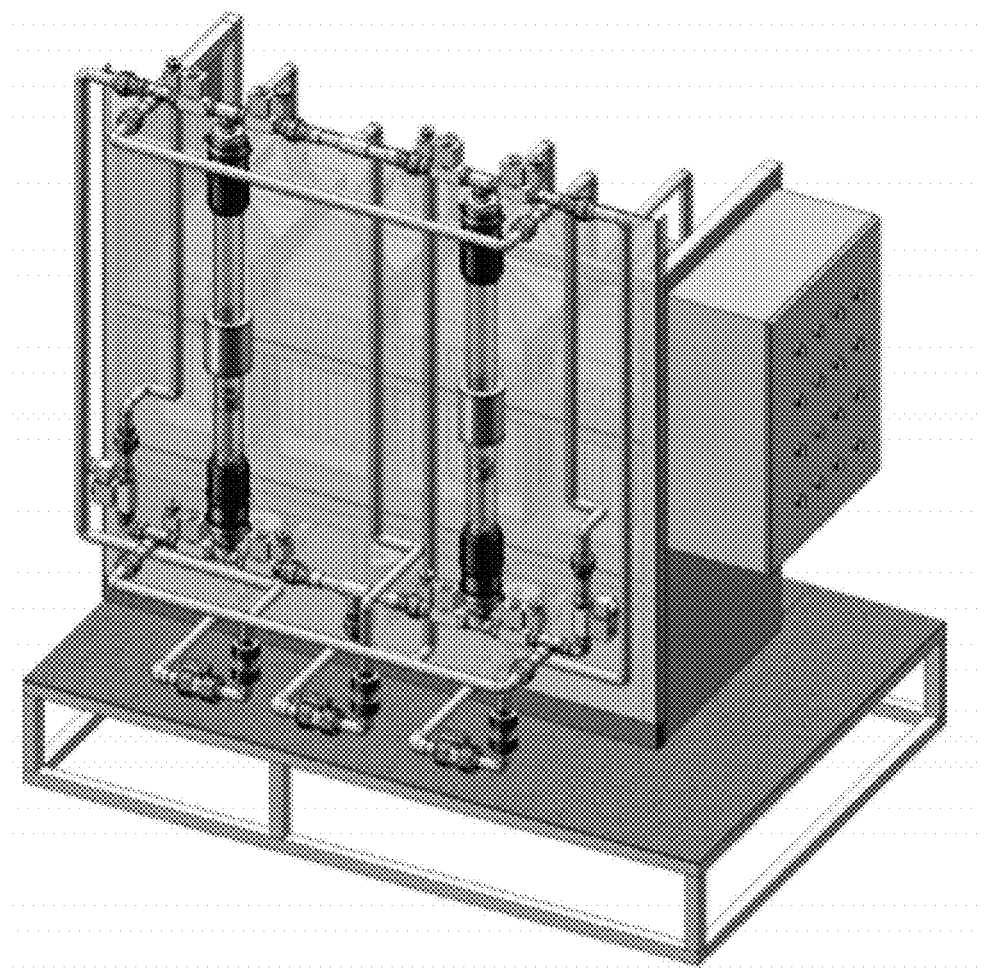
FIG. 4 is a diagram of water treatment apparatus using magnetic nanoparticles (perspective view).
Figure 5:
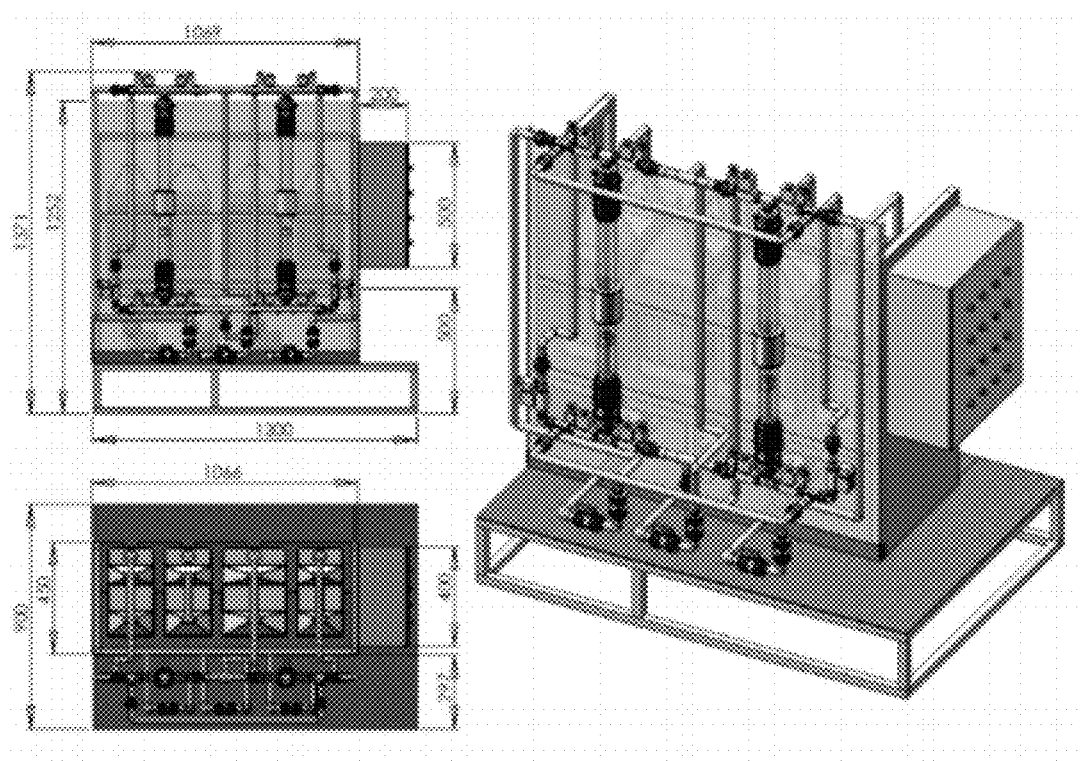
FIG. 5 shows diagrams of water treatment apparatus using magnetic nanoparticles (front, top and perspective views). All numbers are laboratory scale and can be scaled up or down as needed.
Figure 6:
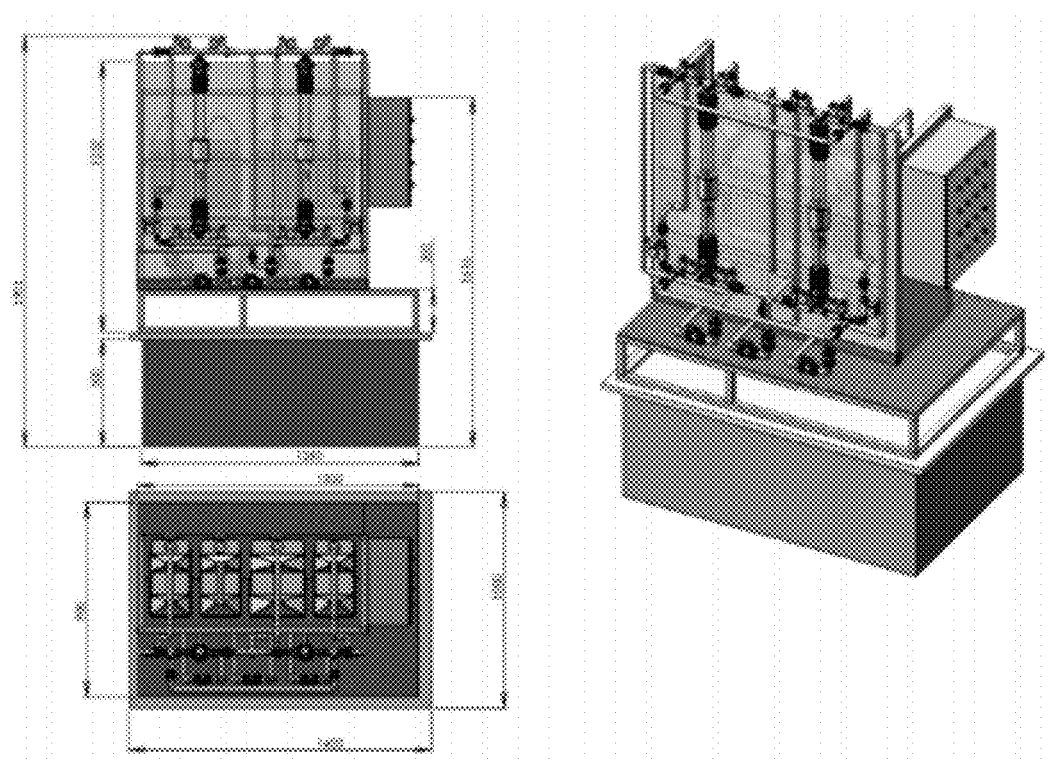
FIG. 6 shows diagrams of water treatment apparatus using magnetic nanoparticles (front, top and perspective views). All numbers are laboratory scale and can be scaled up or down as needed.

FIGS. 5-6 illustrate an example of part of an exemplary embodiment of the magnetic module with dimensions that are for an exemplary laboratory scale, which can be scaled up or down as needed. In the embodiment illustrated in FIGS. 5-6, the stand for water treatment that contains wastewater polluted with heavy metals has a nominal flow rate of 1 $m^3$/h. The water treatment involves two processes: a physical and chemical adsorption onto nanoparticles of heavy metals, followed by the second process such as separation based on ferromagnetic properties of nanoparticles.

Figure 7:
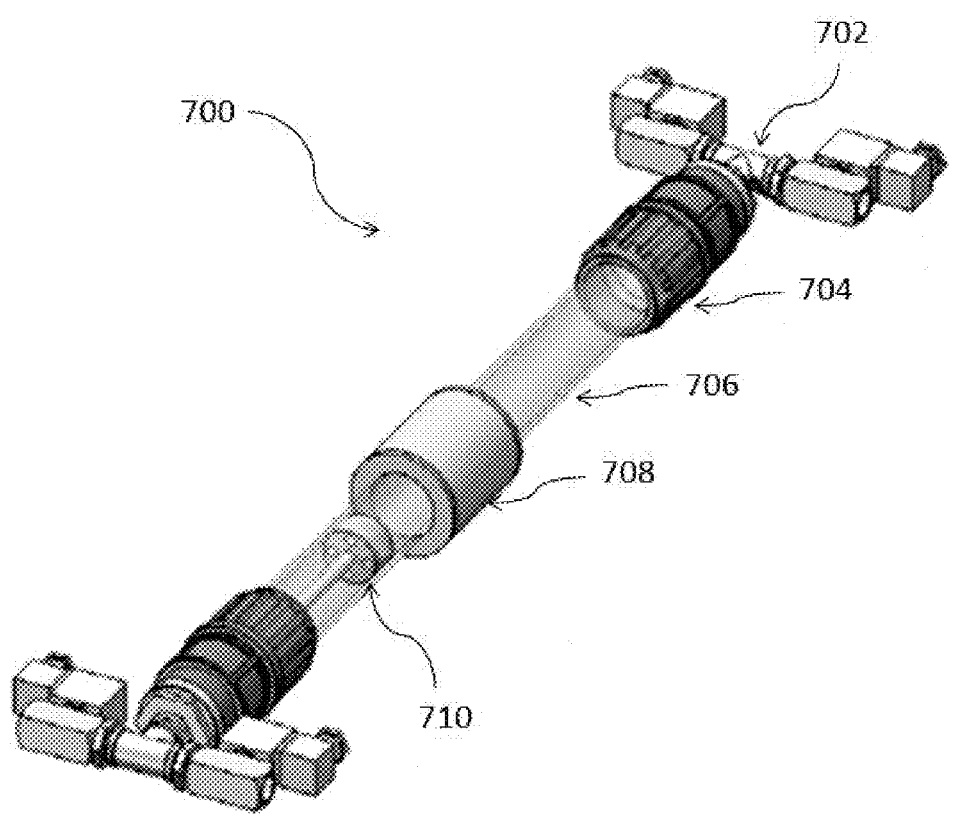
FIG. 7 illustrates a column element with sliding solenoid (perspective view).

FIG. 7 illustrates an example of column 700, containing transparent cylinder 706 sliding solenoid 708, magnet platform 710, electro-vent 704 and distribution system 702, which can be used for water treatment and/or nanoparticle wash and recovery. The treatment of water consists of several technological stages as follows: i) nanoparticles are added and mixed with wastewater is a certain proportion; ii) biphasic water/nanoparticles mixture is treated in the columns under magnetic field; iii) columns are washed with washing reagents and regenerated; iv) columns are washed with clean water; v) nanoparticles are recovered in wastewater basin. In one embodiment, the water purification apparatus works in tandem, i.e. one column works to remove pollutants from water and another columns works to wash and recover nanoparticle. Then, the second column becomes the water treatment column and the fluid circuit is reversed.

Figure 8:
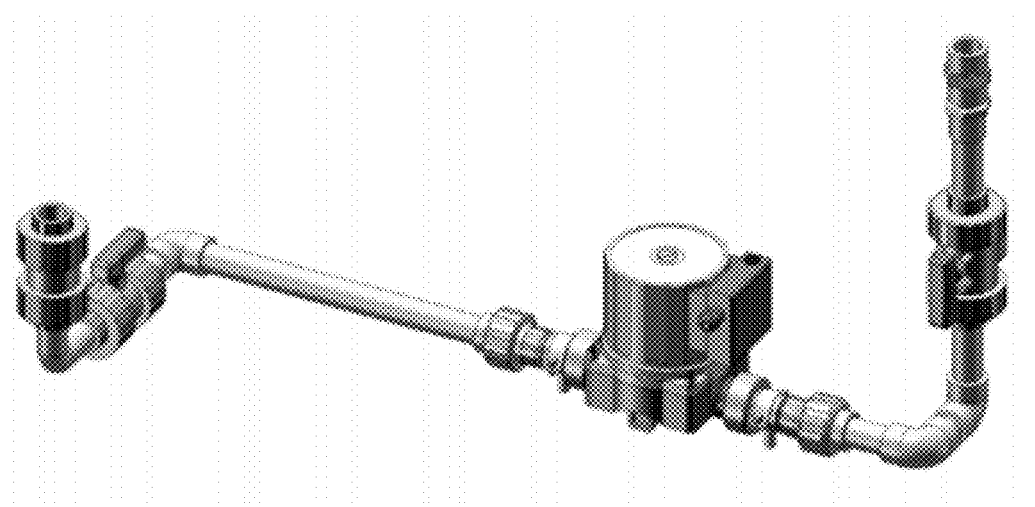
FIG. 8 illustrates a two-way water pump part (perspective view).

In one embodiment, the module is equipped with two columns, one for water treatment and another one for nanoparticle regeneration or washing. In one embodiment, the wastewater containing heavy metals is introduced into the mixing tank while nanoparticles in suspension are also added and mixed together. Wastewater mixed with nanoparticles in suspension is sent through a pumping system to one of the columns. Then, nanoparticles are magnetically separated from the treated water that is sent to a treated water tank with the aid of pumps (FIG. 8)

Washing the column requires a basin with washing reagents. Washing consists of two phases. The first step is wash with a solution containing washing reagents and the second step is wash with clean water.

In one embodiment, the water treatment process consist of a pre-treatment process, when the raw wastewater containing heavy metals is passed through a reservoir with 20 L capacity where nanoparticles were wadded in suspension and homogenized. After that, the treatment process continues in the treatment column. A pump system directs the waters through the columns. In one embodiment there are two columns: one for adsorption process and other for washing and recovery of nanoparticles.

Treatment process involves the operation of one column as treatment column. In this case, the water is passed through de column that has a magnet placed in the middle and nanoparticles are retained onto the surface of the magnet. The treated water is then passed into a storage tank.

In one embodiment, the washing process involves a reagent storage tank from where the reagents are directed to the columns. Washing process has three steps: i) water with reagents is pumped into a reservoir; cleaned water is pumped; nanoparticles are recovered.

The water treatment with magnetic nanoparticles and nanoparticle washing and recovery is a continuous process, where the recovered nanoparticles are brought again in contact with the polluted fluids.

Figure 9:
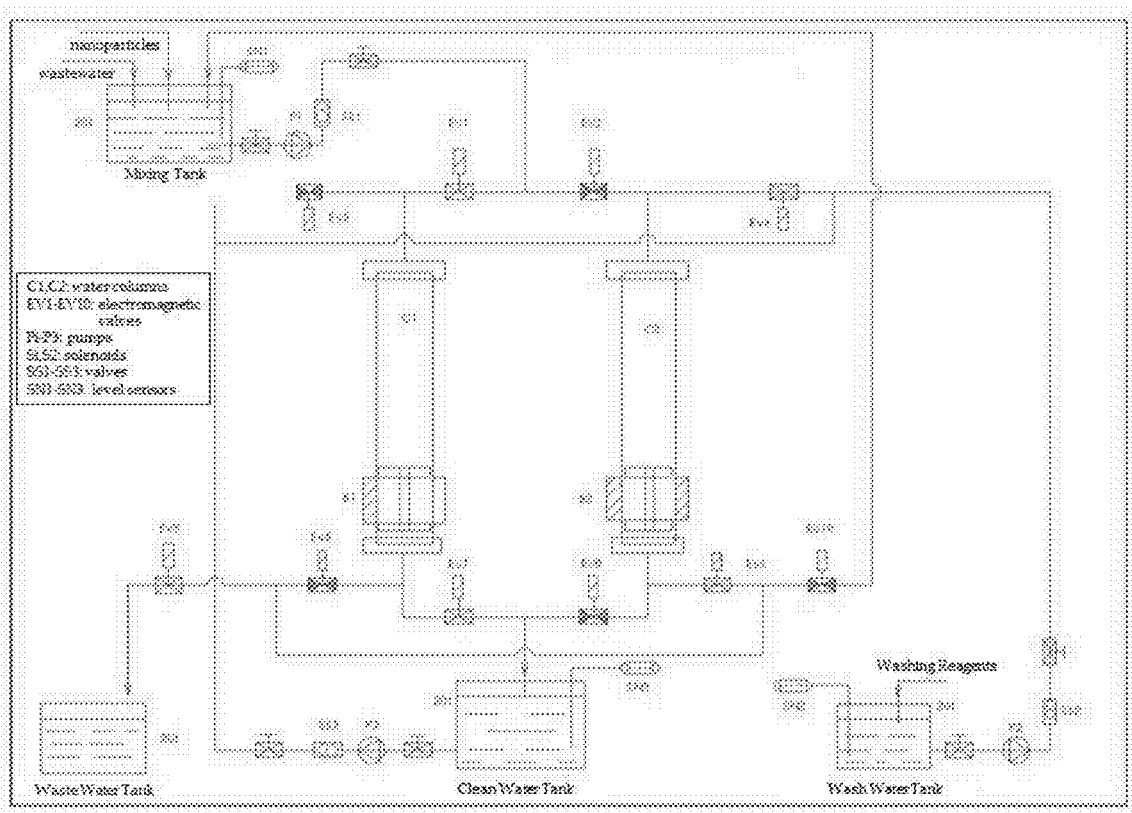
FIG. 9 is a systematic flow diagram of a magnetic separation apparatus working in tandem.

FIG. 9 illustrates an example of flow diagram of an exemplary embodiment of a magnetic separation apparatus working in tandem with two columns. There are four tanks for each water input and output. In one exemplary embodiment, the polluted water is mixed with magnetic nanoparticles in the first tank and than enter the first treatment column with the aid of pumps. The fluid is directed in the direction required by the treatment with the electromagnetic valves that close or open accordingly. The faucets have the role to open or to the water circuit. The pressure created by the pump pushes the liquids through the columns and through the circuit as required. In one embodiment, the fluids flow from the top part of the column through the bottom to the tanks.

After the water is purified and magnetic nanoparticles saturated with pollutants are separated with the aid of sliding solenoid, the water is collected in Tank 2. Water with cleaning reagents can be now brought from the third tank into the column. After nanoparticle cleaning and separating, the solution containing pollutants is brought in Tank 4. In this way, a water treatment circuit is completed.

Example 1

Removal of Hexavalent Chromium from Aqueous Solutions Using Maghemite Nanoparticles This example presents the adsorption results using maghemite nanoparticles as adsorbent for removal of the hexavalent chromium from aqueous synthetic solutions.

Preparation and Characterization of Maghemite ($\gamma$-Fe$_2$O$_3$) Nanoparticles:

There are various methods to prepare $\gamma$-Fe$_2$O$_3$ including sol gel and co-precipitation methods. In this example, nanoparticles were prepared according to a modified co-precipitation method. The 0.5M of ferrous chloride (FeCl$_2$) solution and 0.25M ferric chloride (FeCl$_3$) were mixed with 5 M NaOH solution, until a pH 12 was reached. Then 0.1M D-sorbitol was used to prevent the agglomeration between the nanoparticles. All reagents used were analytical grade and used without further purification. The formation of Fe$_3$O$_4$ takes place according to the reaction:

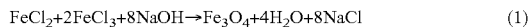

$$FeCl_2 + 2FeCl_3 + 8NaOH \rightarrow Fe_3O_4 + 4H_2O + 8NaCl \qquad (1)$$

The iron solutions were strongly stirred in water, after adding NaOH solution. After mixing the solutions, the color solution changes into black indicating the nucleation of Fe$_3$O$_4$ nanoparticles. The precipitates were separated by magnetic decantation or slow filtration after which they were washed several times with ultrapure water (resistivity of 18 M$\Omega$ cm) until pH 7. Magnetite nanoparticles were dried in oven at 60° C. for 24 hours.

Phase diagram of the Fe—O system shows that Fe and O forms the following oxides: FeO (wustite), Fe$_3$O$_4$ (magnetite), $\alpha$-Fe$_2$O$_3$ (hematite) and $\gamma$-Fe$_2$O$_3$ (maghemite). Magnetite can be expressed as FeO.Fe$_2$O$_3$. Maghemite ($\gamma$-Fe$_2$O$_3$) can be obtained via magnetite (Fe$_3$O$_4$) oxidation. Because nanoparticles have high specific surface, the tendency for oxidation is high. In order to obtain maghemite ($\gamma$-Fe$_2$O$_3$), the magnetite nanoparticles were heated at 200° C., for 3 hours and finally, red-brown maghemite nanoparticles were collected.

The formation of magnetite and maghemite was demonstrated by XRD. Morphology and structure of magnetite and maghemite nanoparticles were observed by transmission electron microscopy through bright field (TEMBF) and selected area electron diffraction (SAED). FIGS. 10-11 show the results obtained on magnetite and maghemite respectively. The size of $\gamma$-Fe$_2$O$_3$ nanoparticles was between 7 and 14 nm.

Batch Adsorption and Recovery Studies

Synthetic solution standards were 40 mg/L and 100 mg/L K$_2$CrO$_4$ p.a. (per analysis). The initial pH value of K$_2$CrO$_4$ standard solution was 7.04. The pH of the solution was then adjusted to values between 2.54 and 6.46 with HCl (0.1 N) and NaOH (0.1 N). Adsorption studies were performed by mixing 0.1 g maghemite ($\gamma$-Fe$_2$O$_3$) nanoparticles with 100 mL solution in a glass vial at room temperature. Adsorption kinetic studies were performed using various pH solutions in contact with 0.1 g $\gamma$-Fe$_2$O$_3$ nanoparticles. Contact time was between 10 minutes and 120 minutes. The concentrations of Cr(VI) and pH values for adsorption studies were chosen to mimic the values of industrial wastewaters. Desorption studies were performed using maghemite nanoparticles washed with ultrapure water for removal of metal adsorbed and 0.01 M NaOH as eluent. Time recovery was 24 hours. Maghemite nanoparticles were magnetically separated from solution and recycled. Solutions containing hexavalent chromium were analyzed by diphenylcarbazide method using a molecular absorption spectrometer. Total chromium was measured with an atomic absorption spectrometer.

Figure 12:
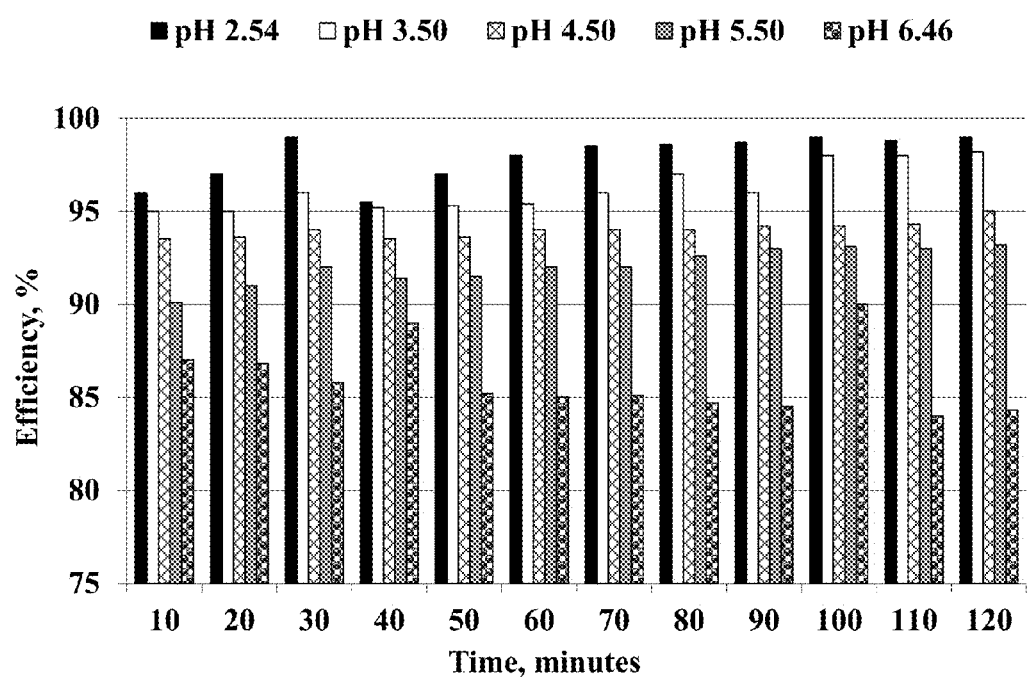
FIG. 12 shows the effect of the solution pH on the Cr (VI) adsorption efficiency.

Specifically, 50 ml of 40 or 100 mg/L Cr (VI) solution and 0.1 g/L $\gamma$-Fe$_2$O$_3$ nanoparticles were mixed. The pH was adjusted to 2.54, 3.50, 4.51, 5.50 and 6.46. FIG. 12 shows a decrease in the rate of Cr(VI) removal with the pH increase. Increasing the solution pH leads to a decrease in Cr(VI) ion uptake. For pH=5.5, Cr(VI) is removed in a proportion of 90%.

The surface of the metal oxides in aqueous solutions is covered with charged hydroxyl groups. The surface charge is neutral at pH=6.3 which is the zero point of charge pH(pzc) for maghemite as observed by Hu et al. in Water Research, (2005) 39, 4528-4536. Magnetic nanoparticle surface is positively or negatively charged at pH lower or higher than 6.3 respectively. Depending on the pH of the solution either anions or cations are adsorbed due to the electrostatic attraction.

The Cr(VI) removal efficiency on the nano-maghemite surface at pH=6.46 is high at the beginning of the process. In time, a desorption process may appear because the pH of the solution is higher than the pH(pzc). In alkaline conditions, the metals can precipitate as more stable complex compounds such as oxides or hydroxides and the adsorption will be inhibited. Hexavalnet chromium in wastewaters is present as chromates (CrO$_4^{2-}$), dichromates (Cr$_2$O$_7^{2-}$) and bichromates (HCrO$_4^-$) that competes with OH$^-$ for adsorptions sites. Additionally, the electrostatic repulsions increase when the nanoparticle surface is negatively charged, which results in other species removal such as bichromates (HCrO$_4^-$) or chromates (CrO$_4^{2-}$).

Figure 13:
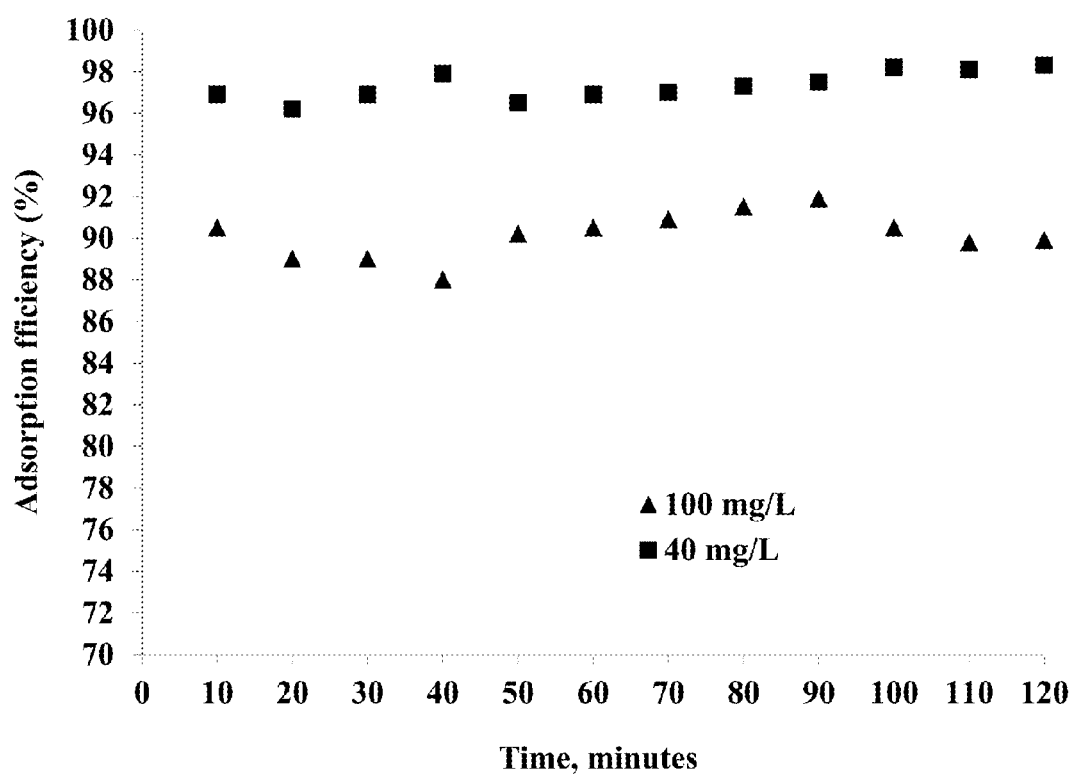
FIG. 13 shows the variation of the maghemite adsorption efficiency (%) in time, for two concentrations.

The highest removal efficiency has a solution with pH=2.5. FIG. 13 illustrates the Cr(VI) adsorption efficiency of maghemite nanoparticles in time at pH=2.5. Removal efficiency remained constant for 2 hours. Removal efficiency depends only by the initial concentration of hexavalent chromium. Notable is the rapid adsorption of chromium on maghemite nanoparticles in the first 10 min. This system can remove 19.16 mg Cr (VI) adsorbed/g after 10 minutes and remains almost the same after 2 h. The removal efficiency is 97% and 90% for 40 mg/L Cr(VI) and 100 mg/L Cr(VI) respectively. Notable is that the Cr(VI) amount adsorbed is higher than others common adsorbent such as activated carbon (15.47 mg/g) or diatomite (11.5 mg/g) according to Hu et al. (Hu J., Chen G., Lo M. C. I., Removal and recovery of Cr (VI) from wastewater by maghemite nanoparticles, Water Research, (2005), 39, 4528-4536).

Maximum adsorption capacity corresponding to adsorbent surface saturation was estimated using the Langmuir equation as expressed by Eq. (2).

$$\frac{C_e}{q_e} = \frac{1}{\theta} \cdot C_e + \frac{1}{\theta \cdot b} \qquad (2)$$

where: $C_e$ is the equilibrium concentration, mg/L; $q_e$ is the amount adsorbed at equilibrium, mg/g; $\theta$ and b are constants related with the adsorption capacity and apparent heat change.

The amount adsorbed at equilibrium, $q_e$, was calculated with Eq. (3).

$$q_e = \frac{(C_0 - C_e) \cdot V}{m} \qquad (3)$$

where: $C_0$ is the initial concentration, mg/L; $C_e$ is the equilibrium concentration, mg/L; V is the volume of solution, L; m is the amount of adsorbent, g.

The necessary characteristics of Langmuir equation can be interpreted in terms of a dimensionless constant separation factor ($R_L$), as defined by Eq. (4).

$$R_L = \frac{1}{1+bC_0} \quad (4)$$

where b and $C_0$ were defined above. The $R_L$ value indicates the types of Langmuir isotherm, i.e. irreversible ($R_L=0$), favorable ($0<R_L<1$), linear ($R_L=1$) or unfavorable ($R_L>1$). Our calculations for Cr(VI) uptake by maghemite nanoparticles indicated a favorable isotherm and a good adsorption capacity at 19.16 mg/g ($R_L=0.0462$, for 40 mg/L Cr(VI), pH=2.5.

Langmuir constants for Cr (VI) adsorption on nano-maghemite for two pH values at 40 mg/L Cr (VI).

| PH values | Langmuir constants | | | |
|---|---|---|---|---|
| | $q_e$ (mg/g)* | b (L/mg) | $R^2$ | $R_L$ |
| 2.54 | 19.16 | 0.51 | 0.9874 | 0.0462 |
| 6.46 | 17.85 | 0.12 | 0.9352 | 0.1701 |

*time: 10 minutes

Cr(VI) ant total Cr were analyzed by molecular absorption spectrometry (diphenylcarbazide method) and flame atomic absorption spectrometry, respectively. Results indicated that there were no chemical redox reaction occurred during the adsorption process. The chromium valence in solution never changes after the adsorption process.

Total chromium concentration results before and after adsorption process at pH = 2.54

| Before adsorption | After adsorption | |
|---|---|---|
| Co Cr (VI), mg/L | Ce Cr (VI), mg/L | Ce Cr tot, mg/L |
| 40 | 1.675 | 1.671 |
| 100 | 4.300 | 4.310 |

Hexavalent chromium adsorption onto maghemite is a reversible process. This makes possible the reuse of the adsorbent, after the cleaning and regeneration. NaOH (1 N) solution can be used was used after the magnetic separation of maghemite from chromium solution. Maghemite was washed 3 times with 3 mL ultrapure water and then washed 3 times with NaOH (1 N) solution. Results showed 96% recovery of nanoparticles.

Example 2

Zn, Ni and Cu Removal from Aqueous Solutions Using Functionalized Magnetic $\gamma$-$Fe_2O_3$ Nanoparticles This example discusses two types of sorbents based on nano-magnetic particles of iron oxide ($\gamma$-$Fe_2O_3$) as precursors for metals removal (ex., Zn, Ni, Cu).

Synthesis of Magnetic Nanoparticles

In this example, magnetic iron oxide ($\gamma$-$Fe_2O_3$) nanoparticles were synthesized via co-precipitation. Salts of ferrous chloride (FeCh) and ferric chloride ($FeCl_3$) in a ratio of 1:2 in the presence of sodium hydroxide solution were used. D-sorbitol was used to prevent the agglomeration between the nanoparticles. The precipitate was then separated by magnetic decantation and washed several times with distilled water and ethanol. In the first step, magnetite nanoparticles ($Fe_2O_3$) were obtained. To obtain maghemite ($\gamma$-$Fe_2O_3$) nanoparticles, the magnetite nanoparticles were heated up to 200° C. for 3 h.

Functionalization of Magnetic Nanoparticles

Figure 14:
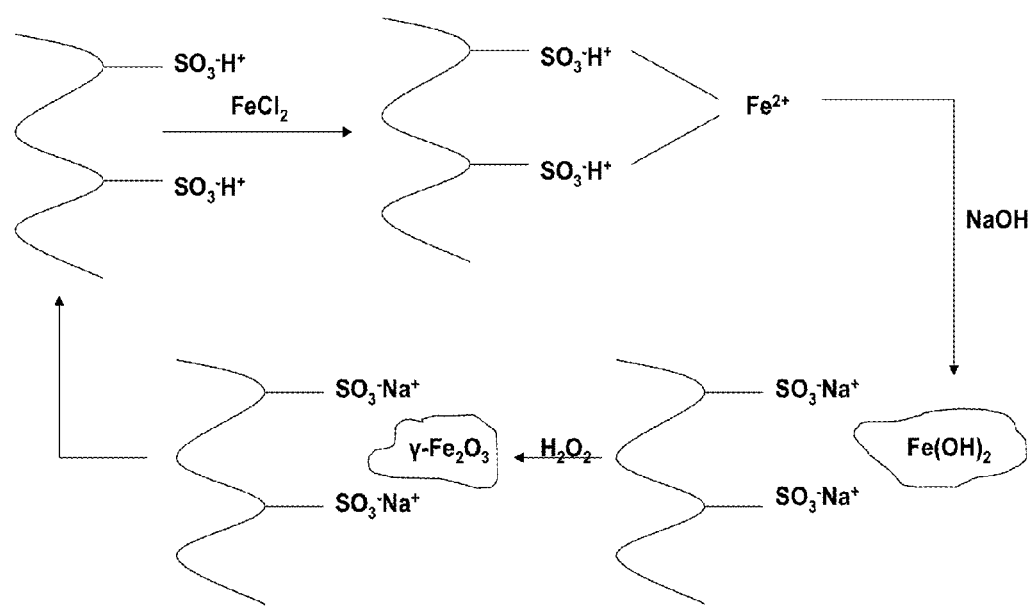
FIG. 14 is a diagram showing the preparation steps of core-shell nanocomposites.

Magnetic nano-iron oxides can be conjugated to a binding molecule that is selective to one or more specific target molecules, such as analytes, cations, anions, and/or molecules. The specific binding molecule is chosen based on the target to be bound. In this example, we used a resin that can be gel type strongly acidic cation exchange resin of the sulfonated polystyrene type. The spherical beads had sizes ranging from 0.3 to 1.1 mm. Its total ion-exchange capacity (wet) was 1.80 mM/mL. The core-shell nanocomposite was obtained by embedding $\gamma$-$Fe_2O_3$ nanoparticles in a polymer matrix using ion exchange process followed by reduction. The method differs in preparation procedure from preparation scheme reported by Ziolo et al (Science, 257 (1992) and Loon et al. (Environmental Chemistry, Oxford University Press, Oxford, (2005). The polymer matrix used in this example was a cross linked polymer of sulphonated divinyl benzene, which have exchangeable $H^+$ ions and containing $SO^{3-}H^+$ groups. The ion exchange resin was exchanged with Fe ions from an aqueous solution of ferrous chloride and then were converted into $Fe(OH)_2$. By addition of dilute aqueous solution of hydrogen peroxide ($H_2O_2$) the conversion to $\gamma$-$Fe_2O_3$ took place. The resin was then washed with water and then dried. The preparation scheme is shown in FIG. 14.

Nanoparticle Characterization

Figure 15:
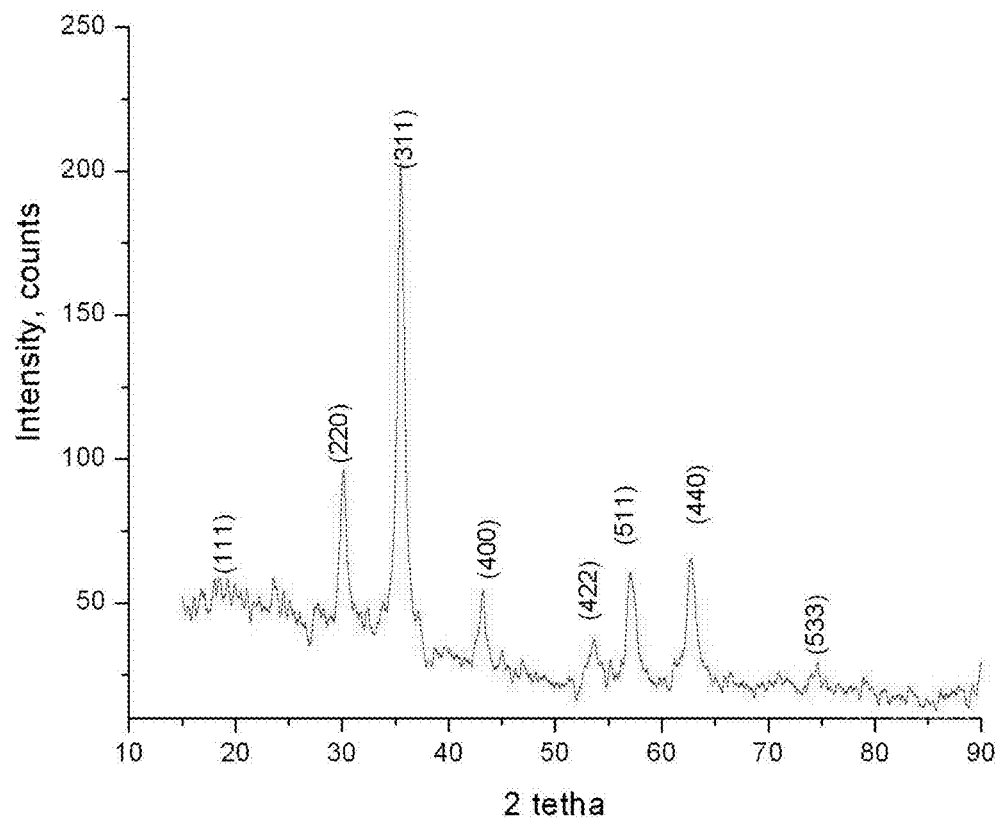
FIG. 15 is a diffraction spectra of $\gamma\text{-}Fe_2O_3$ nanoparticles prepared according to the Example 2.

The crystalline uncoated $\gamma$-$Fe_2O_3$ was analyzed by XRD and the diffraction pattern is shown in FIG. 15. Diffraction peaks reveal a cubic spinel structure with no others phases presented in the sample. The core-shell nanocomposite ($\gamma$-$Fe_2O_3$—R—H) was not analyzed by XRD due to the amorphous state of the resin which embedded $\gamma$-$Fe_2O_3$ nanoparticles. Distribution and morphology of nanoparticles were investigated by TEM. The SAED image confirmed the formation of the $\gamma$-$Fe_2O_3$ nanoparticles. The average size of $\gamma$-$Fe_2O_3$ nanoparticles was 7.13 nm.

Morphology, structure and distribution of $\gamma$-$Fe_2O_3$ nanoparticles embedded in cationic resin are presented in the FIGS. 16A-16C. SAED image FIG. 16B) indicates same diffraction peaks as for $\gamma$-$Fe_2O_3$. The average particle size of $\gamma$-$Fe_2O_3$ does not change by functionalization. Magnetic $\gamma$-$Fe_2O_3$ nanoparticles embedded into resin have an average size of 7.05 nm and a good dispersion (FIG. 16C).

Adsorption Experiments

The content of toxic metals, before and after adsorption experiments was measured by atomic absorption spectrometry. The metal solutions were prepared from stock standard solutions (1000 mg/L) consisting of dissolved metal (Zn, Ni, Cu) into nitric acid. Fifty milliliters of stock solution 1000 mg/L multi-component solution (Zn, Ni, Cu) and 1 g/L $\gamma$-$Fe_2O_3$ nanoparticles were mixed at pH of 2.5. Same concentration was used for the mixtures with 1 g/L R—H-$\gamma$-$Fe_2O_3$. The pH of the solution was chosen to mimic the pH of industrial wastewaters, such as electroplating or steel industry. In acidic environments, metal ions can have the following oxidation states: Ni(II), $NiSO_4^0$, Cu(II), and Zn(II). Additionally, mixed solutions were used in order to evaluate the maximum quantity adsorbed on $\gamma$-$Fe_2O_3$ and core-shell nanocomposite ($\gamma$-$Fe_2O_3$—R—H). Contact time was 120 minutes and samples were analyzed at every 20 minutes. The removal efficiency was calculated according to the following equation:

$$\eta = \frac{(C_0 - C_e)}{C_0} \times 100 \qquad (5)$$

Figure 17:
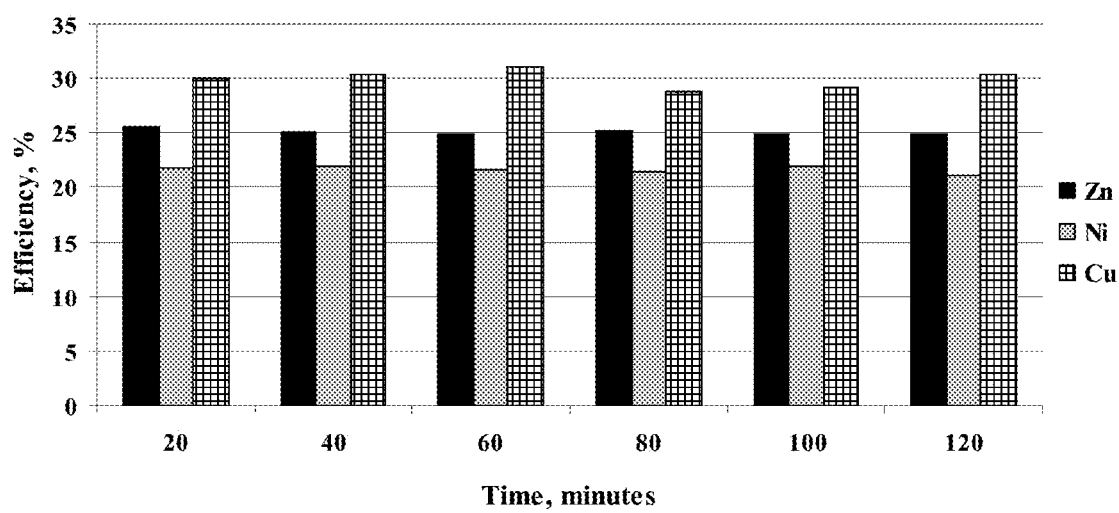
FIG. 17 is a chart showing the removal efficiency using $\gamma\text{-}Fe_2O_3$ as sorbent in acidic solution (pH 2.5).

The amount adsorbed at equilibrium, qe, was calculated based on Eq. (3). The removal efficiency in time for $\gamma$-$Fe_2O_3$ particles is presented in FIG. 17. After 20 minutes, the removal efficiency for all metal ions of interest (i.e. Zn, Ni, Cu) is about 30% under acidic conditions and remains almost the same for 2 hours. The reason for low removal efficiencies in solutions with pH smaller than the zero point of charge (pHpzc=6.3) is due to the fact that the adsorbent surface is positively charged and cations of metals are not adsorbed but anions. In contrast, the adsorption on R—H-$\gamma$-Fe2O3 nanoparticles and the removal efficiency were significantly higher compared to $\gamma$-Fe2O3 nanoparticles. FIG. 17 shows that the removal of Cu(II) reached at almost 82%. The removal efficiency decrease in the following order: Cu(II)>Zn(II)>Ni(II), same as in the case of uncoated $\gamma$-$Fe_2O_3$. High removal efficiency of R—H-$\gamma$-$Fe_2O_3$ nanoparticles is due to the contribution of both ionic exchange and the adsorption. Uncoated $\gamma$-$Fe_2O_3$ and R—H-$\gamma$-$Fe_2O_3$ were separated by an external magnet.

Time dependence of the metal amount adsorbed at equilibrium (qe, mg/g) is shown in FIGS. 18A and 18B for $\gamma$-$Fe_2O_3$ and R—H-$\gamma$-$Fe_2O_3$, respectively. Equilibrium is reached after 20 minutes and remains constant for 2 hours. The amount of metal adsorbed at equilibrium depends on the type of the metal: Cu (15 mg/g)>Zn (12.75 mg/g)>Ni (10.9 mg/g).

Figure 19:
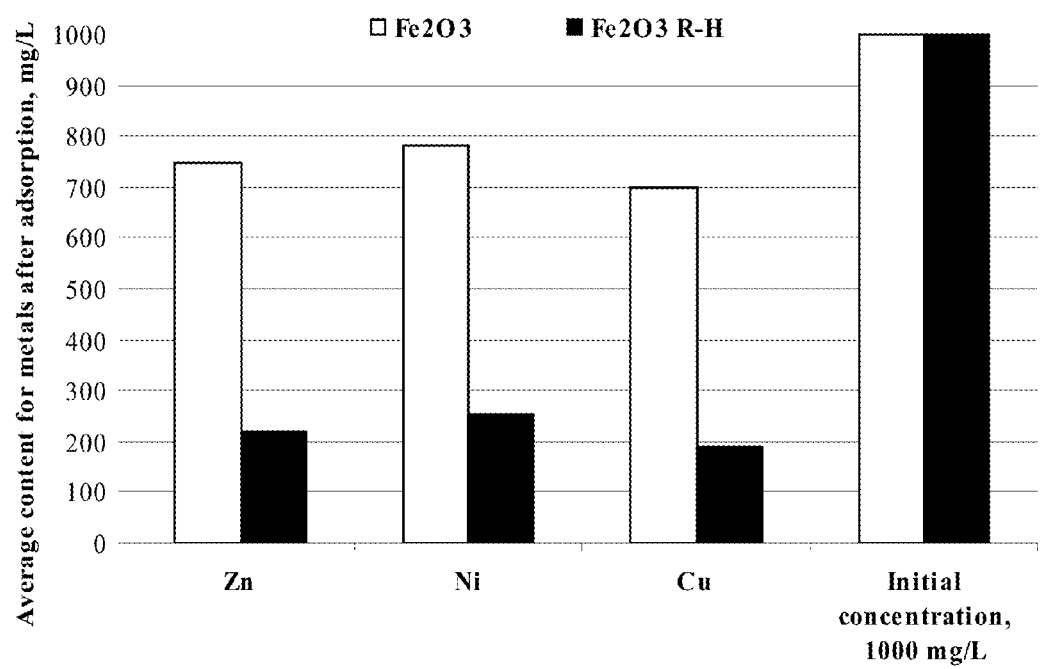
FIG. 19 is a chart showing the comparison between the initial and final concentrations (mg/L) of the metals adsorbed onto $\gamma\text{-}Fe_2O_3$ and R—H-$\gamma\text{-}Fe_2O_3$.

In case of R—H-$\gamma$-$Fe_2O_3$, qe values increase significantly due to the contribution of ionic exchange mechanism of the resin in the following order: Ni (37.5 mg/g)<Zn (39 mg/g)< Cu (40.5 mg/g). FIG. 19 shows the difference between initial and final concentrations, after the adsorption of Zn, Ni and Cu on $\gamma$-$Fe_2O_3$ and R—H-$\gamma$-$Fe_2O_3$. The highest final concentration was recorded for Ni (784 mg/L for $\gamma$-$Fe_2O_3$ and 254 mg/L for R—H-$\gamma$-$Fe_2O_3$), this metal being less adsorbed compared to the other two metals of interest. The final concentrations recorded (after adsorption) were for Zn: 750 mg/L for $\gamma$-$Fe_2O_3$ and 220 mg/L for R—H-$\gamma$-$Fe_2O_3$ and for Cu: 701 mg/L for $\gamma$-$Fe_2O_3$ and 190 mg/L for R—H-$\gamma$-$Fe_2O_3$ in case of Cu.

Example 3

Leaching Tests for Synthesized Magnetite Nanoparticles Used as Adsorbent for Metal Ions from Liquid Solutions Synthesis of Magnetite ($Fe_2O_3$) Nanoparticles In this example, magnetic iron oxide (magnetite) nanoparticles were synthesized by co-precipitation. Synthesis included mixing a volume of 5 mL solution of Fe (II) and Fe (III) chloride (molar ratio 1:2) in ultrapure water and then pouring the solution slowly (dropwise) into a three-neck flask reaction vessel containing 40 mL of 0.9M $NH_4OH$ solution. The solution was vigorously stirred for 30 minutes and then the precipitated magnetite was separated from the supernatant by decantation. The solid was washed 4 times with ultrapure water and separated by decantation. Finally, the suspension was centrifuged at 4000 rpm and the solid was dried in a desiccator.

Conjugation of Nanoparticles

To prevent the aggregation of magnetite nanoparticles, surfactants such as fatty acids can be added to the solution containing nanoparticles. Predoi et al (in Digest J Nanomat. Biostructures, 5 (3), 779 (2010) used dextran as a surfactant for magnetic maghemite nanoparticles. Dextran is a natural polysaccharide, which has a good solubility in water and is inert in biological systems.

In this example, the iron salt solution was added to 50% (w/v) solution of dextran and the pH of the solution was adjusted to 11 with a drop of NaOH solution. According to Kawaguchi et al. (in J Mat. Sci.: Mater. Med., 12, 121-127 (2001)), the carboxyl group of dextran binds to the iron atom at pH 11. Subsequently, the value of pH was further decreased to 7 by adding HCl, followed by reflux for 1 h at 100° C. Solution was left to reach room temperature. Then, methanol was added to precipitate dextran particles ($Fe_2O_3$-D). After centrifugation for 15 min, the solution was left to rest overnight. The solution was then adjusted to pH=8 with a drop of NaOH solution and concentrated in iron base using an evaporator.

Figure 20:
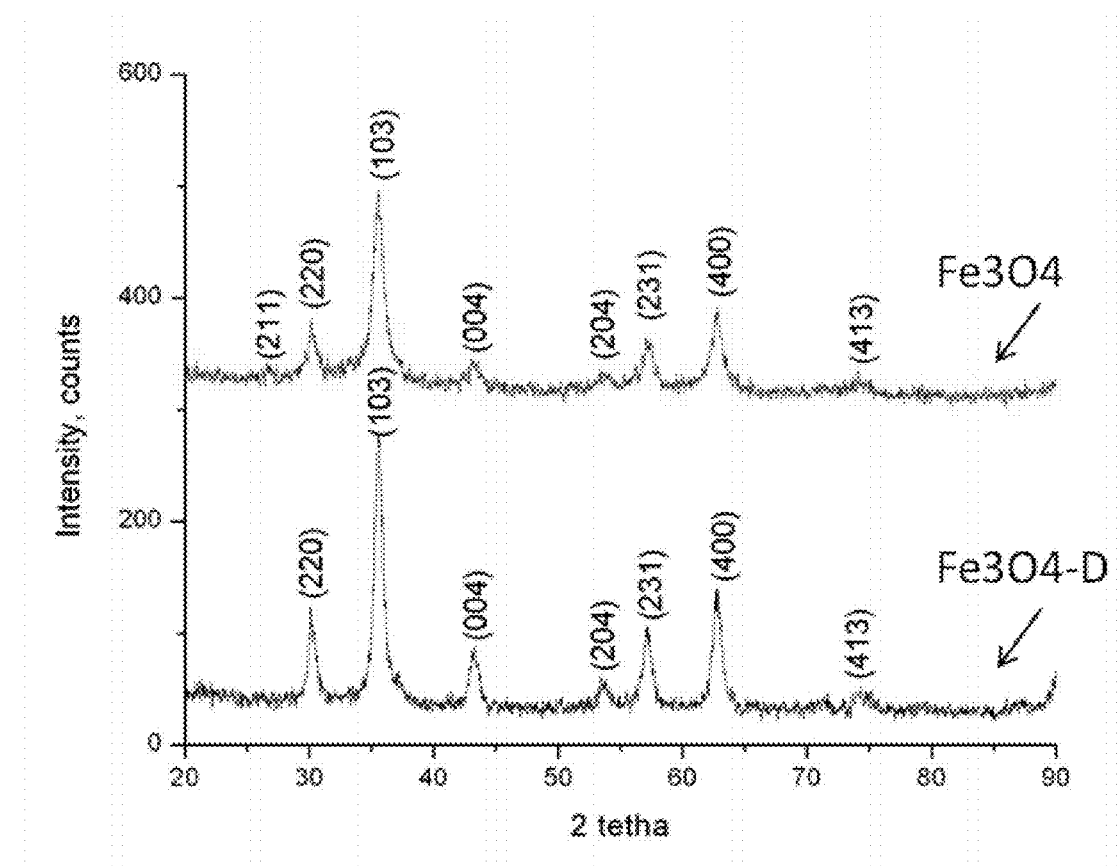
FIG. 20 shows the X-Ray diffraction spectra $Fe_3O_4$ and $Fe_3O_4$-D nanoparticles.

Magnetic nanoparticles were characterized by XRD and SEM. FIG. 20 shows the X-ray diffraction pattern for both $Fe_2O_3$ and $Fe_2O_3$-D nanomaterials. Synthesized nanoparticles are $Fe_2O_3$ with orthorhombic crystal system according to ASTM reference code 01-075-1609. The XRD revealed the presence of maghemite ($\gamma$-$Fe_2O_3$) in tetragonal crystal system as a secondary phase. The 2$\theta$ peaks at 35.48°, 43.17°, 53.50°, 56.16°, 62.69°, 74.29° are attributed to the crystal planes of magnetite at (220), (103), (004), (204), (231), (401) and (413), respectively. The maximum peak intensity is at 35.48° which correspond to (103) $Fe_2O_3$. Another characteristic peak occurred at 62.69° which corresponding to (400) $Fe_2O_3$. Since the magnetite nanoparticles are not stable in oxygen due to the Fe2+ ions which can easily oxidize to ferric ions, the maghemite formation is unavoidable. Only one maghemite peak was observed at 26.24° corresponding to the maghemite (211) crystal plane (according to ASTM 03-065-0390). XRD of $Fe_2O_3$-D nanoparticles are missing the 26.24° corresponding to the maghemite (211) crystal plane. Compared to $Fe_2O_3$, XRD peak intensities of $Fe_2O_3$-D are higher, which can indicate the augmentation of magnetite nanoparticles by coating with dextran.

FIGS. 21-22 present the SEM observations of the magnetic nanoparticles at two magnifications. Magnetic particles of $Fe_2O_3$ and $Fe_2O_3$-D have spherical or oval shapes but their size is under 100 nm. Several nanoparticles adhere to each other and agglomerate. The tendency of nanoparticles aggregation remains after dextran coating. By comparison, the tendency of agglomeration is higher for $Fe_2O_3$ nanoparticles versus $Fe_2O_3$-D nanoparticles due to the dextran viscosity.

Leaching Test

Leaching test demonstrates the stability of the compounds in a given liquid solution. Because the final application of magnetic nanoparticles is for wastewater treatment, the leaching test was performed under acidic, neutral and basic conditions. The method was validated under SR ISO CEI 17025/2005 requirements. Nanoparticle stability was evaluated under different pH values by adding either hydrochloric acid (HCl 0.1 M) or sodium hydroxide (NaOH 0.1M) or both to the nano-magnetic ($Fe_2O_3$ and $Fe_2O_3$-D) suspensions to obtain pH of 2.5, 6.5 and 8.5. After stirring, the suspensions were isolated by centrifugation with an iron hallow cathode lamp (HCL). Samples were magnetically separated and the supernatant was analyzed by flame atomic absorption spectrometry (FAAS). The total iron leached amount in different solutions was measured.

Figure 23:
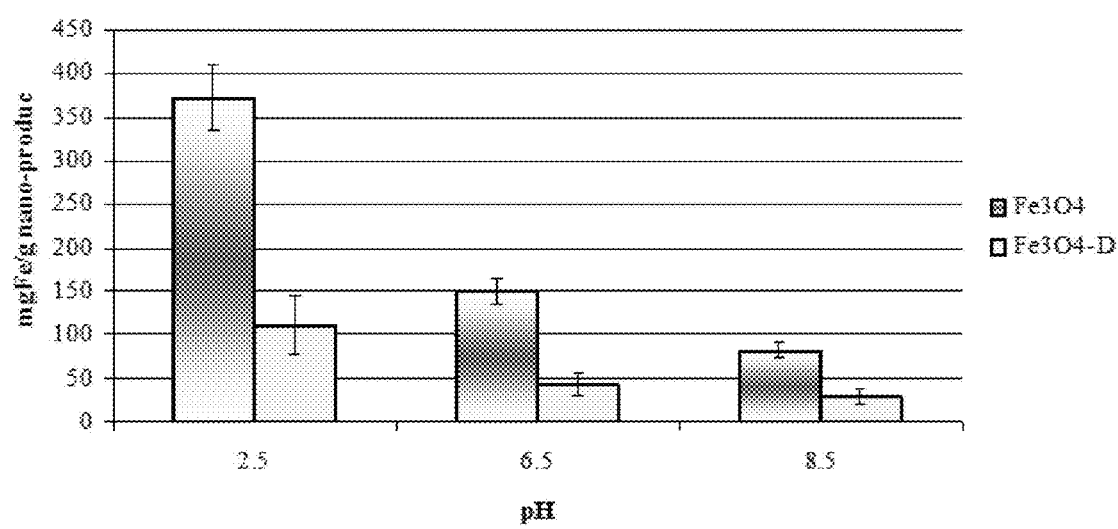
FIG. 23 is a chart showing the total dissolved iron concentrations (mg/g) obtained by FAAS.

In this example, 1 g of magnetic material was added to 100 mL solution of interest. The contact time was 24 hours. FIG. 23 shows the averaged results of the leaching test. The total amount of the dissolved iron content, expressed as mg/g, was higher for $Fe_2O_3$ than for $Fe_2O_3$-D. Iron dissolution tendency was higher for acidic conditions compared to neutral or basic solution.

Under acidic conditions (pH 2.5), $Fe_2O_3$ nanoparticles had the lowest stability. The total dissolved amount of iron was about 400 mg/g for $Fe_2O_3$ and 150 mg/g for $Fe_2O_3$-D at pH of 2.5. Similar trend was observed for neutral (pH 6.5) and basic conditions (pH 8.5). The highest stability was demonstrated for $Fe_2O_3$-D nanoparticles under basic conditions at pH of 8.5. The acidic conditions at pH of 2.5, $Fe_2O_3$ has the highest dissolution value, i.e. the lowest stability. This example demonstrate the efficacy of coating nanoparticles to increase their stability in various pH solutions while preserve their magnetic properties, and their use in water treatment process due to their high surface area and reactivity.

Example 4

Nano-Iron Oxides Properties for Use in Various Industrial Applications

This example shows the synthesis of various iron oxides (i.e. magnetite ($Fe_2O_3$), maghemite ($\gamma$-$Fe_2O_3$) and copper ferrite ($CuFe_2O_4$)) nanoparticles with high adsorption capability for several metal ions that are present in wastewaters.

Synthesis of $Fe_2O_3$ Nanoparticles

The synthesis method was partial reduction coprecipitation for $Fe_2O_3$ nanoparticles, followed by aeration of acidified magnetite nanoparticles for obtaining the $\gamma$-$Fe_2O_3$ nanoparticles, and also a mechanical alloying in order to obtain a nanoscale compound, copper ferrite ($CuFe_2O_4$). In general, the synthesis of monodispersed particles is performed under a kinetic control of the precipitation using very dilute solutions, the transitory precipitation of another phase or thermohydrolysis conditions.

In this example, sodium sulfite ($Na_2SO_3$) was added under magnetic stirring into ferric chloride ($FeCl_3$) dissolved in HCl. Ammonia solution was added under vigorous stirring when the color of the solution turned into black. The black precipitate was immediately formed and a complete crystallization took place after 30 minutes. The precipitate was washed by distilled water until the pH of the suspension reached at 7.5. The precipitate was separated with an external magnet and dried at ambient temperature under vacuum. A part of this precipitate was used for obtaining the maghemite ($\gamma$-$Fe_2O_3$) nanoparticles.

Figure 25:
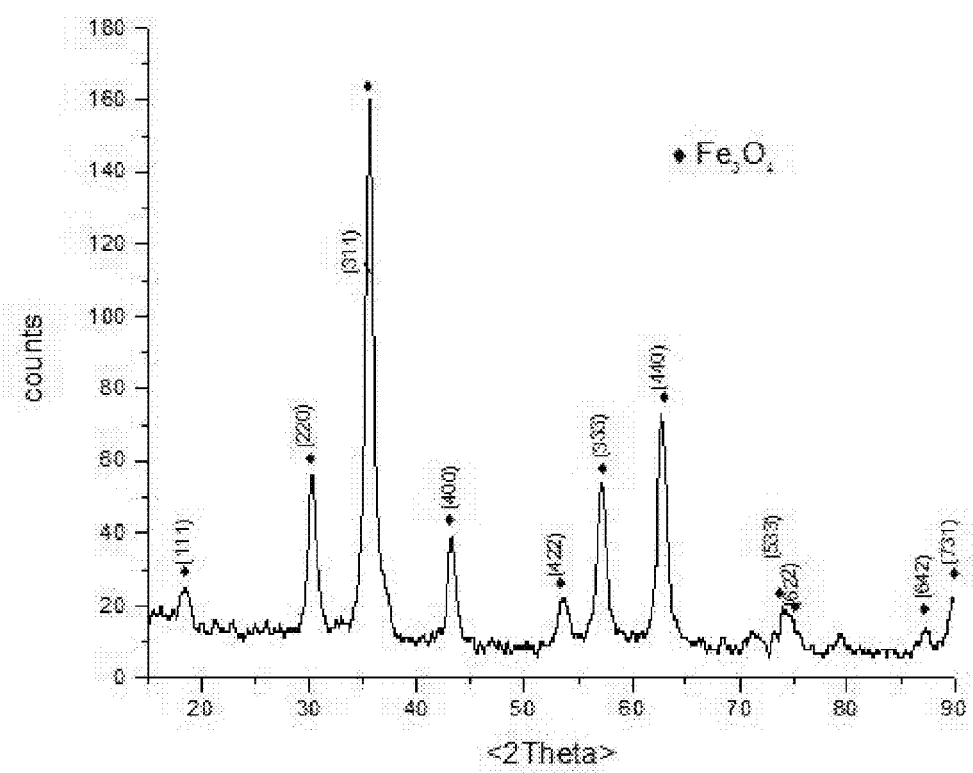
FIG. 25 is an X-ray diffraction spectra of the $Fe_3O_4$ nanoparticles obtained in Example 4.

FIG. 24A presents the transmission electron microscopy in the bright field (TEMBF) image mode. In this example, spherical $Fe_2O_3$ nanoparticles with an average diameter of 10 nm show good dispersion. To identify the plans associated with the maximum values of the magnetite nanoparticles, the selected area electron diffraction (SAED) was used. FIG. 24B shows the SAED image of nanoparticles that synthesized in this example. The composition of the $Fe_2O_3$ was confirmed by the X-ray energy dispersion (EDX) microanalysis of the analyzed. FIG. 24C shows the EDX image that demonstrates the presence of iron and oxygen, with iron element being more abundant than oxygen. The presence of copper along with Fe and O in this example is due to the TEM grid used for sample investigation. The crystalline structure of the nanoparticles synthesized in this example was verified by X-ray diffraction. FIG. 25 shows the XRD spectrum of the $Fe_2O_3$ nanoparticles synthesized in this example. The broad diffraction lines demonstrate the nano-size of particles, which are smaller than 20 nm. Combined with XRD patterns, the data indicates the inverse cubic spinel structure of $Fe_2O_3$.

Synthesis of $\gamma$-$Fe_2O_3$ Nanoparticles

In this example, to obtain maghemite ($\gamma$-$Fe_2O_3$) nanoparticles, a portion of black precipitate of magnetite ($Fe_2O_3$) nanoparticles was diluted and pH value adjusted at 3.0 with HCl (0.1 N). The temperature was raised at 90° C. and stirred under aeration for one hour. The color of the suspension changed from black to reddish-brown and the supernatant became clear and transparent. The precipitate was washed with distilled water and then magnetically separated.

Figure 27:
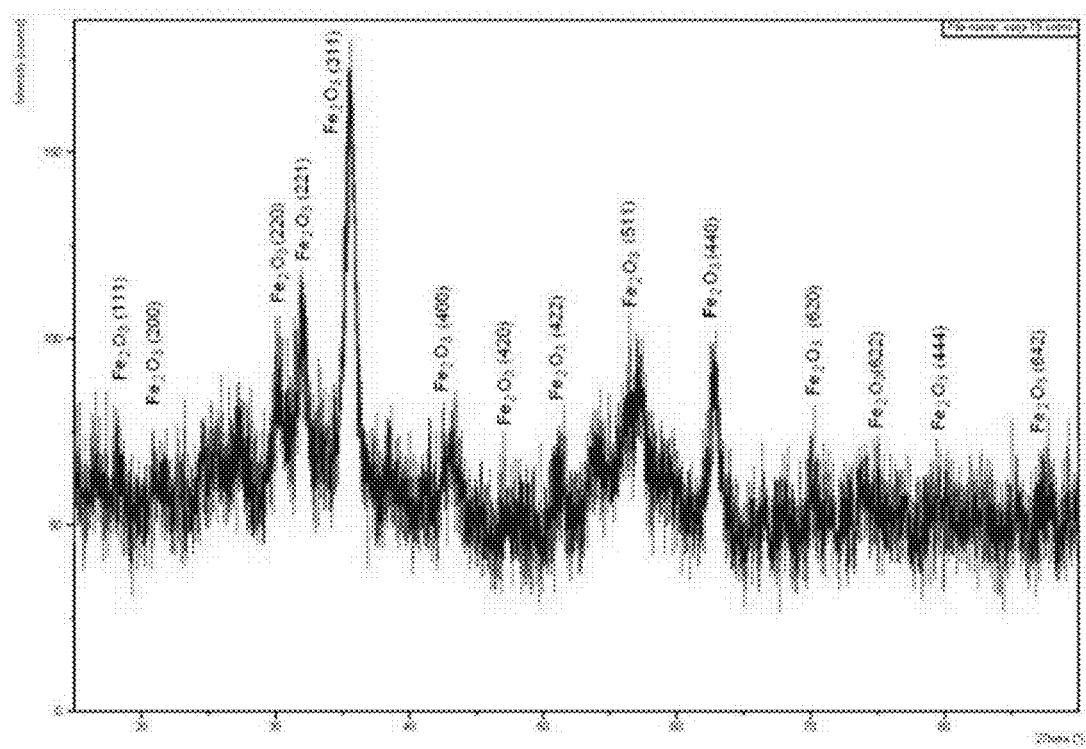
FIG. 27 is the X-ray diffraction spectrum of $\gamma\text{-}Fe_2O_3$ nanoparticles prepared according to the procedure of Example 4.

Magnetite can be found under the formula FeO. $Fe_2O_3$. Maghemite ($\gamma$-$Fe_2O_3$) can be formed by the magnetite oxidation, which can happen in air. Because nanoparticles have large specific surface, they present a high risk of oxidation. In this example, $\gamma$-Fe2O3 nanoparticles were obtained from aeration oxidation of acidified magnetite nanoparticles. FIG. 26 shows the TEMBF and SAED images of the maghemite nanoparticles presented in this example. Nanoparticles were in a form of red-brown precipitate with a relative good dispersion and an average of diameter size of 7 nm. FIG. 26C shows the EDX image that indicates the presence of the iron and oxygen, while FIG. 27 shows the X-ray diffraction patterns that demonstrate the crystalline nature. All the diffraction peaks that were indexed in FIG. 27 indicate that the nanoparticles were maghemite. Maghemite nanoparticles synthesized in this example samples showed very broad diffraction lines, which agreed with their small particle size and high specific surface area. Nanoparticles synthesized in this example had a cubic crystalline structure for both iron oxides nanoparticles: i.e. magnetite and maghemite.

Synthesis of Copper Ferrite ($CuFe_2O_4$) Nanoparticles

Most of the $MeFe_2O_4$ nanoparticles are synthesized using chemical precipitation method proposed by Hu et al. in Separation and Purification Technology, 56, 249 (2007). Also, the mechanical alloying represents another method for obtaining of $MeFe_2O_4$ nanoparticles. The alloying process is strongly dependent by chemical reactivity of the reagents, ambient conditions (aeration or inert gas), intensity and duration of the process. Due these parameters, the final products can be homogenous amorphous phases or crystalline and amorphous phase mixtures.

In this example, $CuFe_2O_4$ was obtained by ball milling for five hours in ambient atmosphere using two ratios of $Fe_2O_3$: Cu of 1:1 and 1:4.

FIG. 28 is the TEM image of $CuFe_2O_4$ morphology and shows an agglomeration of many ultrafine particles with diameter lower than 50 nm. The EDX microanalysis was performed using carbon grid in order to avoid the interference of other elements. The image of EDX for $CuFe_2O_4$ is presented in FIG. 28B The average diameters of nanoparticles synthesized in this example are presented in the following table:

The average diameter size for $Fe_3O_4$, $\gamma$-$Fe_2O_3$ and $CuFe_2O_4$ nanoparticles

| Nanomaterials | Average diameter size, nm | Investigation method |
|---|---|---|
| $Fe_3O_4$ | 10 | TEM, EDX, XRD |
| $\gamma$-$Fe_2O_3$ | 7 | |
| $CuFe_2O_4$ | 10 | |

Effect of pH on Nano-Iron Oxides

To evaluate the stability of nanoparticles under various pH values, hydrochloric acid (HCl 0.1 N) and sodium hydroxide (NaOH 0.1N) were added into nano-iron suspensions. The total dissolved iron content was measured at pH 2.5 and 8.5. After stirring, the nano-iron oxides suspensions were isolated by centrifugation and then magnetically separated. The supernatant was analyzed by atomic absorption spectrometry (AAS) to measure the total dissolved iron content. The GBC 932 AB Plus spectrometer, with flame and spectral domain between 185-900 nm, was equipped with an iron hallow cathode lamp (HCL). Determinations were made at 283 nm. For concentrations under detection limit of the flame atomic absorption spectrometer (FAAS), an AVANTA Ultra Z graphite furnace atomic absorption spectrometer (GFAAS) with Zeeman effect was used, with analytical wavelength of 248.3 nm for iron, lamp current 12.5 mA, spectral bandwidth of 0.2 nm.

The tested nano-materials were $Fe_2O_3$, $\gamma$-$Fe_2O_3$ and $CuFe_2O_4$. A small amount of each nanomaterial of 0.5 g was added to 100 mL HCl and NaOH, respectively. The contact time was between 10 and 120 minutes. After the last measurement, a new measurement was performed after 24 hours. the results obtained for acidic conditions are shown in the following table:

The FAAS measurements of the total dissolved iron concentrations, mg/L, at pH 2.5

| Time, minutes | Total dissolved iron content, mg/L, from: | | |
|---|---|---|---|
| | $\gamma$-$Fe_2O_3$ | $Fe_3O_4$ | $CuFe_2O_4$ |
| 10 | 26.164 | 8.986 | 3.289 |
| 20 | 22.658 | 10.865 | 3.275 |
| 30 | 39.105 | 10.756 | 3.657 |
| 40 | 40.123 | 10.342 | 3.897 |
| 50 | 42.156 | 11.382 | 4.387 |
| 60 | 44.362 | 11.870 | 4.890 |
| 70 | 45.786 | 15.890 | 6.987 |
| 80 | 48.897 | 15.240 | 6.912 |
| 90 | 48.654 | 15.380 | 7.854 |
| 100 | 50.120 | 15.980 | 7.750 |
| 120 | 49.567 | 16.000 | 7.843 |
| 24 hours | 52.222 | 19.543 | 8.965 |

The iron oxide nanoparticles with the lowest stability in acidic conditions is $\gamma$-$Fe_2O_3$, which has the largest amount of dissolve iron. The concentration of dissolved iron increased in time and after 24 hours the concentration reached at 52.222 mg Fe/L. Lower concentrations were observed for $Fe_2O_3$ and $CuFe_2O_4$.

In case of basic conditions, at pH 8.5, the results are presented in the following table:

GFAAS measurements of the total dissolved iron concentrations, mg/L, at pH 8.5.

| Time, minutes | Total dissolved iron content, mg/L, from: | | |
|---|---|---|---|
| | $\gamma$-$Fe_2O_3$ | $Fe_3O_4$ | $CuFe_2O_4$ |
| 10 | 0.048 | 0.150 | 0.009 |
| 20 | 0.000 | 0.150 | 0.005 |
| 30 | 0.012 | 0.140 | 0.010 |
| 40 | 0.015 | 0.134 | 0.010 |
| 50 | 0.142 | 0.156 | 0.012 |
| 60 | 0.100 | 0.176 | 0.075 |
| 70 | 0.110 | 0.140 | 0.065 |
| 80 | 0.090 | 0.120 | 0.073 |
| 90 | 0.099 | 0.110 | 0.076 |
| 100 | 0.130 | 0.130 | 0.069 |
| 120 | 0.111 | 0.110 | 0.061 |
| 24 hours | 0.083 | 0.130 | 0.120 |

Because the total dissolved iron content in basic conditions was under the detection limit of the FAAS, graphite furnace atomic absorption spectrometer (GFAAS) was used instead for measuring the trace iron dissolved. It can be observed the highest concentrations were for $CuFe_2O_4$ and the lowest for the $Fe_2O_3$.

Magnetic nanoparticles can be prepared inexpensively, they can adsorb to remove toxic substances from wastewaters or they can magnetically attract and retain paramagnetic nanomaterials that have to be removed from solutions. In this example, $\gamma$-Fe2O$_3$ nanoparticles were used as adsorbent for hexavalent chromium Cr(VI) and then magnetically separated.

Example 5

Magnetite Nanoparticles as Adsorbent for Cr, Cd, Ni and Cu from Aqueous Solutions In this example, magnetite nano-particles ($Fe_2O_3$) were synthesized and used as adsorbent for certain toxic metal ions (Cr, Cd, Ni and Cu) present in industrial wastewaters. Various process parameters such as metal concentration, pH of the solution, and contact time with magnetite nanoparticles were analyzed to assess and control the adsorption process.

Nanoparticle Synthesis

Magnetite nanoparticles were prepared by conventional coprecipitation method from aqueous solution. In a solution of 50 mL 0.5 M $FeCl_2$ and 50 mL 0.25 M $FeCl_3$ aqueous solution, 5 M NaOH solution was added drop by drop under vigorous stirring until pH of 12 was reached. After the reaction completed, the solution containing $Fe_2O_3$ nanoparticles were let to rest and cooled to room temperature. The solution became dark-brown color. Then, the solution was centrifuged at a rate of 4,000 rpm, washed several times with distilled water until pH reached 7, and finally dried overnight at 80° C., under vacuum.

Figure 29:
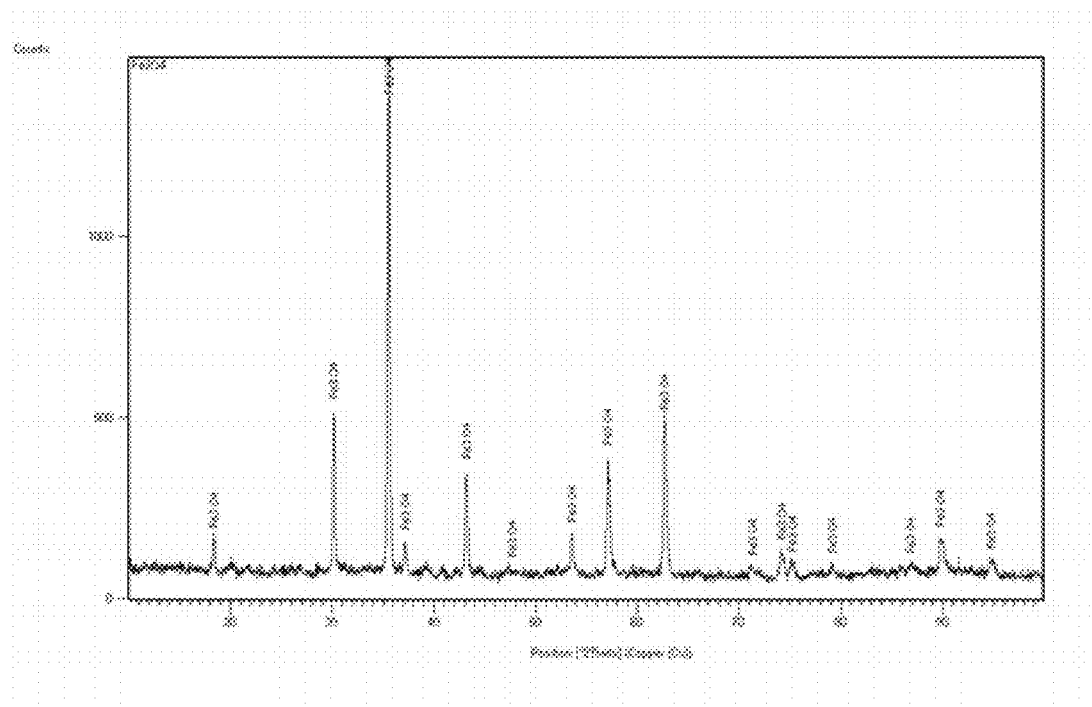
FIG. 29 is the X-ray diffraction spectrum of the $Fe_3O_4$ nanoparticles as obtained according to Example 5.

Adsorbent Characterization $Fe_2O_3$ nanoparticles were analyzed, before and after its use as adsorbent, by X-ray diffraction (XRD), energy dispersive X-ray (EDX) and transmission electron microscopy (TEM). The X-ray powder diffraction analysis was performed with a SHIMADZU XRD 6000 diffractometer at room temperature, using Cu K$\alpha$ radiation ($\lambda$=1.54065 Å) over the 2$\theta$ range of 20° to 90° and with a scanning rate of 2 degrees/min. FIG. 29 shows the X-ray diffraction spectrum of magnetite nano-particles with a cubic spinel structure.

Only the $Fe_2O_3$ peaks are present on XRD spectrum. Other phases, such $Fe(OH)3$ or $Fe_2O_3$, which are the usual products in a chemical co-precipitation method, were not detected.

The transmission electron microscopy (TEM) images, energy dispersive X-ray (EDX) diffraction patterns and selected area electron diffraction (SAED) spectra were recorded with a TECNAI F30 G2 high resolution transmission electron microscope with 1 Å line resolution and with an EDX detector with 133 eV resolution. FIG. 30A presents the TEM image of the nanoparticles. Selected area electron diffraction pattern (SAED) presented in FIG. 30B confirms the presence of magnetite nanoparticles in the analyzed sample. Because of the lack of interferences of other ferrous or ferric salts, nanoparticles are considered pure. Particle size distribution obtained from FIG. 30A using the TEM software is presented in FIG. 30C. The histogram represents the size range grouped into segments to establish how many particles are in each size range. It is evident that the size distribution is quite narrow with an average size around 15.02 nm.

In order to evaluate the stability of the magnetite nanoparticles under different pH conditions, 0.1 g magnetite nanoparticles were immersed acidic (pH 2.5) and respectively in alkaline (pH 8.5) quaternary metals solutions and stirred for 10 minutes. The magnetite nano-particles were then separated (using an external magnetic field) and the supernatant was measured by flame atomic adsorption spectroscopy (AAS) in order to assess leached iron.

Adsorption Experiments

The mono-component metal solutions were prepared from Merck standard solutions, which consist of dissolved metal into nitric acid, in case of cadmium, nickel and copper; for Cr (VI) solution, potassium chromate (K2CrO4) was dissolved in distilled water. Each mono-component metal solution concentration was 1000 mg/L. These solutions were then diluted with ultra-pure water in order to obtain three final concentrations of 10, 20 and 50 mg/L, respectively. The composition of heavy metals presented in this example is similar to the composition of industrial wastewaters. The main problem remains the concentrated solution of the metals obtained after adsorption treatment, one of the solutions being their storage into clinker components as inert materials used for cement industry.

Figure 31:
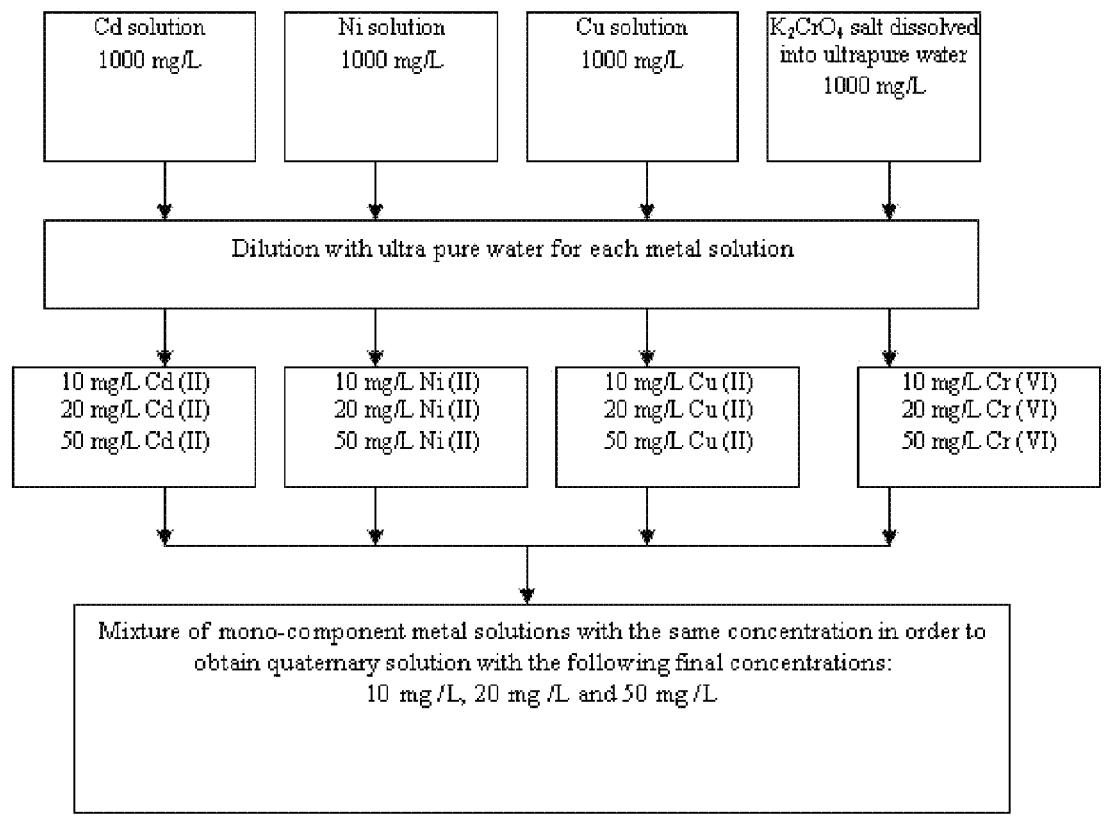
FIG. 31 is a flowing chart showing the preparation of the quaternary component solutions containing Cd, Ni, Co and Cr, used in Example 5.

The mono-component metal solutions with the same concentrations were mixed in order to obtain three final quaternary component solutions (Cd, Ni, Cu, and Cr). The preparation of multi-component solutions is presented in FIG. 31.

Adsorption studies were performed by mixing of 0.1 g $Fe_2O_3$ nanoparticles with 100 mL of quaternary solutions (containing Cr, Cd, Ni and Cu) with three different concentrations i.e. 10, 20 and 50 mg/L of each metal. Magnetite nanoparticles were dispersed in the quaternary solution by stirring at a rate of 600 rpm with a magnetic stirrer. For adsorption kinetic studies, the quaternary solutions were kept in contact with magnetite nanoparticles for different time periods (from 10 to 100 minutes). The absorption tests were performed at room temperature (22° C.) and for two different pH values i.e. 2.5, achieved by adding HCl (0.1 N) to the quaternary solution and 8.5 achieved by adding of NaOH (0.1 N) solution. The $Fe_2O_3$ nanoparticles were recovered by magnetic separation at different time intervals (from 10 to 100 minutes) and were analyzed by TEM and EDX in order to obtain information regarding the adsorbed metals onto $Fe_2O_3$ nano-particles surface. The aqueous solutions obtained after the recovery of the magnetite nanoparticles, were measured by AAS using a GBC 932 AB Plus spectrometer with spectral domain between 185 and 900 nm. For detection of hexavalent chromium in solution, a spectrophotometer Cintra 202 GBC was used.

The Langmuir model was chosen for adsorption studies in order to calculate the amount of adsorbed metal at a fixed temperature (22° C.). The metal adsorption data were analyzed according to the linear form of the Langmuir model. In order to evaluate if the estimated data correspond to actual Langmuir model the R-squared values (R2) were calculated for each metal.

The amount of adsorbed metal at equilibrium (qe) was calculated according to the Equation (3). The removal efficiency of metals from quaternary solutions was calculated with Equation (5).

Batch Adsorption Studies

The removal efficiency of Cr, Cd, Ni and Cu from the quaternary aqueous solutions with different concentrations, after 10 to 100 minutes of contact with magnetite nanoparticles, at pH 2.5, is shown in FIG. 32.

Table in FIG. 32 shows that the removal efficiency of each metals from a quaternary solution is over 87% within the first 10 minutes. No significant changes occur in the next 90 minutes. Metal removal efficiency increases with the increase of the quaternary solution concentration due to the competition between protons and metals for adsorbance sites on the magnetite nano-particles surface. The high values of Cd removal efficiency (over 90%) for a solution with a low concentration (10 mg/L) can be due to the reduced solubility of this metal under acidic conditions in comparison with Cu and Cr.

The tendency of adsorption depends on atomic radius of the metals presented in this example. Thus, the adsorption capacity decreases from Cr (166 pm)>Cd (161 pm)>Ni (149 pm)>Cu (145 pm). FIG. 32 shows that the removal efficiency increase with increasing the concentration of each metal, which suggests that the adsorption sites onto nano-magnetite particles are still available and are not saturated with metal ions. Langmuir relation assumes that the solid (adsorbent) surface has a specific number of sites and when all these sites are occupied no further adsorption can occur (van Loon et al., 2005). Although the results are in agreement with Langmuir equation, the results obtained in this example suggest that the concentrations of a certain metal ions can be higher and adsorption can still take place. Also, the agglomeration tendency of the nano-adsorbent, as appears in FIG. 30A, can result in a decrease of the adsorbent capacity in regards to the removal efficiency.

The Cr concentration in solutions was assessed by AAS for total chromium content and with spectrophotometer for hexavalent chromium content. Because the values obtained for Cr content were similar, we assumed that during the adsorption process in acidic conditions Cr is in a predominant oxidation state as Cr(VI).

Figure 33:
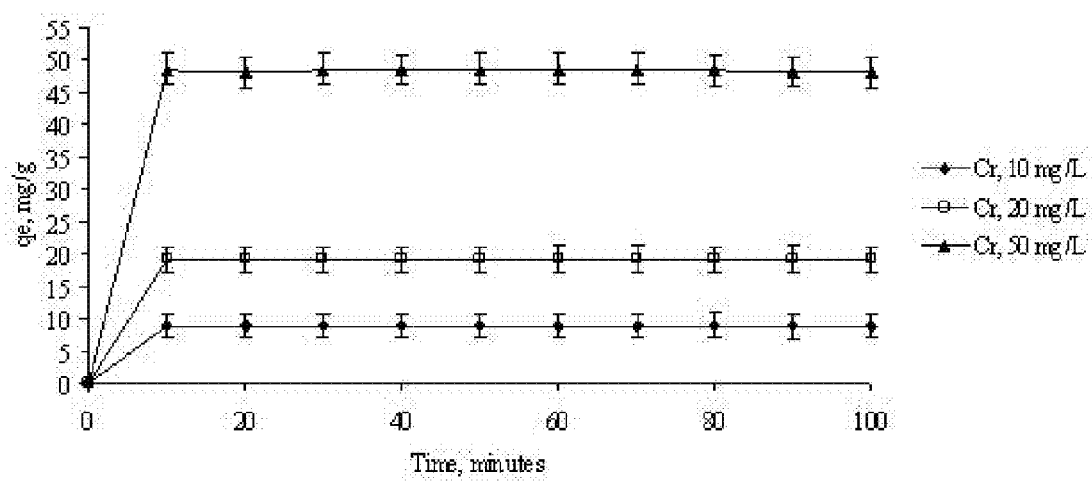
FIG. 33 is a chart representing the amount of Cr (VI) adsorbed at pH 2.5 on 0.1 g $Fe_3O_4$ nanoparticles (qe, mg/g) vs. contact time in aqueous quaternary solution of various Cr concentrations.

FIG. 33 shows the evolution of Cr (VI) amount (qe) adsorbed onto magnetite nanoparticles in time. In this example, the quaternary solutions with different concentrations were used. Similar results were obtained for other metal ions of interest, i.e. Ni, Cu, Cd. The highest metal amount adsorbed on magnetite nanoparticles was achieved within the first 10 minutes of contact in the quaternary solution with the highest concentration (50 mg/L). The metal amount adsorbed on the magnetite decreases with the dilution, i.e. 20 mg/L and 10 mg/L. For all three concentrations of the quaternary solution, the amount of heavy metals adsorbed on the magnetite nano-particles decrease in the following series: Cr>Ni>Cu>Cd. The increase of contact time up to 100 minutes did not result in an increase of the amount of metals adsorbed on the magnetite nanoparticles. This can be explained by the saturation of the adsorption sites on the magnetite nano-particles surface in the first 10 minutes of contact with solution.

The preferential adsorption of Cr on magnetite nanoparticles it is due to the low pH value of the solution, i.e. 2.5. Regazzoni et al. (Journal of Colloid Interface Science, 91, 561-569.) published the point of zero charge (pHpzc) for magnetite to be between pH 6.3 and pH 6.89. In acidic conditions, i.e. below pHpzc, the surface of the adsorbent is charged with a positive charge; anions (i.e. $CrO_4^{2-}$) adsorption is facilitated.

The chromium amount adsorbed onto the magnetite nanoparticles (48.5 mg/g) obtained in this example is higher compared to the amount of Cr adsorbed at pH 2-3, on other materials such as activated carbon (15.47 mg/g) or diatomite (11.5 mg/g) according to Hu et al. in Water Research, 39 (2005).

FIG. 34 shows the removal efficiency of Cr, Cd, Ni and Cu from the quaternary aqueous solutions with different concentrations in a basic solution (pH 8.5). In basic conditions obtained by adding 1 N NaOH solution, the removal of metal ions from the quaternary solution is the result of two distinct processes: i) formation of metal hydroxides and precipitation, and ii) the adsorption of metal ions onto magnetite nanoparticles. In order to discriminate between the two processes, the amount of each metal remained in the solution was measured by AAS. The efficiency of the metal removal is presented in FIG. 35. In this example, the majority of the metal is removed by the formation and precipitation metal hydroxides.

Unlike acidic conditions, the increase in metal concentration does not substantially increase the amount of adsorbed metals on magnetite nanoparticles. The removal efficiency of metals from multi-component solution decreases in the following order: Ni>Cd>Cr>Cu. The lower Cr adsorption in basic condition as compared to acidic conditions at pH 2.5 can be due to the electrostatic repulsion. At pH>pH(pzc), the surface of the magnetite is negatively charged, which results in electrostatic repulsion between negatively charged Cr (VI) species and negatively charged adsorbent surface. This situation can also result in a release of the adsorbed $HCrO^{4-}$ and $CrO_4^{2-}$ from magnetite nanoparticles surface. In alkaline conditions, the overall removal efficiency for Cr, Cd, Ni and Cu is higher than under acidic conditions, due to both processes involved: precipitation and adsorption onto $Fe_2O_3$ nanoparticles.

In order to assess the distribution of adsorbed metals on the magnetite nanoparticles, TEM and EDX analysis on selected areas were performed. FIG. 36 shows the TEM image and corresponding EDX spectra obtained on $Fe_2O_3$ nanoparticles after 10 minutes of contact with quaternary solution at pH 8.5. Because the adsorbed metals are evenly distributed on the surface of magnetite nanoparticles, the adsorption process can be interpreted using the Langmuir model. Langmuir model parameters, qe (mg/g) from Eq. (3) and R2 for metal adsorption on 0.1 g $Fe_2O_3$ nanoparticles, at different pH values, are given in the FIG. 37.

The qe and R values indicate a good affinity of metal ions for adsorption onto $Fe_2O_3$ nanoparticles. Additionally, data fit well on the Langmuir monolayer adsorption isotherm, considering a homogenous surface of adsorbent, without chemical interaction between adsorbate and metal ions. The highest amount of metal adsorbed at equilibrium was achieved in acidic conditions and decreased in the following order: Cr>Ni>Cd>Cu. The R values indicate a good correlation that can be established under basic conditions, at pH 8.5.

Adsorbent Stability

The magnetite nano-particles stability during the adsorption process was assessed by the amount of Fe leached in the quaternary solution after 10 minutes, as follows:

| Fe leached from $Fe_2O_3$ nanoparticles at different pH values | | |
|---|---|---|
| Initial concentration of metals in quaternary | Fe leached. mg/g | |
| solution, mg/L | PH 2.5 | PH 8.5 |
| 10 | 40.33 | 0.15 |
| 20 | 20.10 | 0.02 |
| 50 | 10.30 | 0.01 |

In this example, the nano-magnetite has a higher tendency for dissolution into acidic solution than alkaline solution i.e. 40.33 mg Fe/g $Fe_2O_3$ is dissolved at pH 2.5 as compared with only 0.15 mg Fe/g $Fe_2O_3$ at pH 8.5. The increase of heavy metals concentrations in solution (from 10 mg/L to 50 mg/L), results in a decrease of the Fe leached from the adsorbent. These results can be explained by the saturation of the adsorption sites with metal ions in a concentrated quaternary solution in either acidic or alkaline conditions. The decrease of leached iron with the increase of heavy metals concentrations in acid solution can be correlated with monolayer adsorption of the metal ions. A high stability of the magnetite nanoparticles in alkaline conditions (pH 8.5) as observed in this example is in agreement with the data reported by He et al. (2005, Environmental Science and Technology, 39, 4499) and explained by the formation onto the magnetite surface of a passivation layer of goethite, maghemite, and/or $Fe_{1-x}Cr_xOOH$. To increase the stabilization of magnetite nanoparticles in acidic conditions, magnetic nano-particles with core-shell structure functionalized with different groups (such as $NH_2$, COOH, SH, OH), can be used to increase the metal cations retention.

The main advantage for this process, as an industrial treatment step, would involve magnetic separation which implies "zero emission of excess sludge".

What is claimed is:

1. An apparatus for removing target pollutants and toxic metal ions from a liquid using magnetic nanoparticles in a batch or a continuous process comprising:
   a reaction chamber to mix the liquid with the magnetic nanoparticles;
   a first column having a sliding solenoid externally mounted thereon, an internal magnetic platform configured to be magnetized or demagnetized with the solenoid, and a distribution system;
   a washing chamber having means for adding washing reagents;
   and a wastewater tank.

2. The apparatus of claim 1 further comprising a second column similar in construction as the first column in tandem with the first column.

3. The apparatus of claim 1 wherein the magnetic platform comprises a plurality of holes to allow the liquid to pass through while capturing the magnetic nanoparticles when the platform is magnetized.

4. The apparatus of claim 1 wherein treating of the liquid and regeneration of the nanoparticles take place in the same column.

5. The apparatus of claim 2 wherein treating the liquid takes place in the first column while regenerating the spent nanoparticles in the second column.

6. The apparatus of claim 1 in which the magnetic nanoparticles are of iron oxides or transition metal oxides with magnetic properties.

7. The apparatus of claim 1 wherein the magnetic nanoparticles have functionalized surfaces.

8. The apparatus of claim 1 wherein the magnetic nanoparticles are paramagnetic or supermagnetic.

9. A method of treating a liquid using the apparatus of claim 1 comprising:
- mixing the liquid with magnetic nanoparticles,
- passing the liquid through the first column to capture the magnetic nanoparticles on the magnetic platform to obtain a purified liquid,
- releasing and then mixing the spent magnetic nanoparticles with a reagent solution, and
- passing the spent magnetic nanoparticle solution through the first column to capture regenerated magnetic nanoparticles.

* * * * *